United States Patent
Liu et al.

(10) Patent No.: US 12,068,992 B2
(45) Date of Patent: Aug. 20, 2024

(54) DMRS PORT INDICATION METHOD AND APPARATUS

(71) Applicant: HUAWEI TECHNOLOGIES CO., LTD., Guangdong (CN)

(72) Inventors: Xianda Liu, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/330,922

(22) Filed: Jun. 7, 2023

(65) Prior Publication Data

US 2023/0318776 A1 Oct. 5, 2023

Related U.S. Application Data

(63) Continuation of application No. 17/587,417, filed on Jan. 28, 2022, now Pat. No. 11,711,188, which is a continuation of application No. PCT/CN2020/105567, filed on Jul. 29, 2020.

(30) Foreign Application Priority Data

Jul. 30, 2019 (CN) .......................... 201910696565.0

(51) Int. Cl.
*H04L 5/00* (2006.01)
*H04B 7/0413* (2017.01)

(52) U.S. Cl.
CPC ......... *H04L 5/0048* (2013.01); *H04B 7/0413* (2013.01)

(58) Field of Classification Search
CPC .............. H04L 5/0048; H04L 27/2613; H04B 7/0413
See application file for complete search history.

(56) References Cited

U.S. PATENT DOCUMENTS

2018/0278395 A1* 9/2018 Yoon ..................... H04L 5/0051

FOREIGN PATENT DOCUMENTS

| CA | 3045196 A1 | 5/2011 |
|---|---|---|
| CA | 3053864 A1 | 2/2019 |
| CN | 106256107 A | 12/2016 |
| CN | 108111272 A | 6/2018 |
| CN | 108809609 A | 11/2018 |
| CN | 109842469 A | 6/2019 |
| CN | 110034890 A | 7/2019 |
| CN | 110034895 A | 7/2019 |

(Continued)

OTHER PUBLICATIONS

Extended European Search Report issued in European Application No. 20848109.3 on Sep. 6, 2022, 11 pages.

(Continued)

*Primary Examiner* — Rahel Guarino
(74) *Attorney, Agent, or Firm* — Fish & Richardson P.C.

(57) ABSTRACT

Example demodulation reference signal (DMRS) A DMRS port indication methods and apparatus are provided, to meet NC JT transmission. In one example method, a network device determines DMRS port indication information and quasi-co-location (QCL) indication information, and sends the DMRS port indication information and the QCL indication information. The DMRS port indication information is used to indicate a DMRS port set, the DMRS port set is one of a plurality of DMRS port sets.

22 Claims, 12 Drawing Sheets

Repeat transmission 1 in time domain

Repeat transmission 2 in time domain

(56) References Cited

FOREIGN PATENT DOCUMENTS

| CN | 111183594 A | 5/2020 |
|---|---|---|
| EP | 3468061 A1 | 4/2019 |
| WO | 2014148811 A1 | 9/2014 |
| WO | 2019029329 A1 | 2/2019 |
| WO | 2019100873 A1 | 5/2019 |
| WO | 2019130847 A1 | 7/2019 |
| WO | 2019137144 A1 | 7/2019 |

OTHER PUBLICATIONS

Huawei, HiSilicon, "Summary of AI: 7.2.8.2 Enhancements on Multi-TRP/Panel Transmission of Offline Discussion," 3GPP TSG RAN WG1 Meeting #97, R1-1907706, Reno, USA, May 13-17, 2019, 66 pages.

Intel Corporation, "On the remaining details of DM-RS," 3GPP TSG RAN WG1 Meeting NR #3, R1-1716300, Nagoya, Japan, Sep. 18-21, 2017, 17 pages.

Noh et al., "DMRS Design and Evaluation for 3GPP 5G New Radio in a High Speed Train Scenario," GlobeCom 2017 IEEE Global Communications Conference, Dec. 2017, 6 pages.

Office Action issued in Chinese Application No. 201910696565.0 on Jun. 30, 2021, 14 pages (with English translation).

Office Action issued in Indian Application No. 202237010346 on Oct. 13, 2022, 8 pages.

PCT International Search Report and Written Opinion issued in International Application No. PCT/CN2020/105567 on Sep. 28, 2020, 17 pages (with English translation).

Qiubin et al., "Analysis on massive beamforming in the 5G NR. Information and Communications Technology and Policy," Information and Communications Technology and Policy, No. 11, Nov. 2018, 8 pages (with English abstract).

\* cited by examiner

| 0 | 1 | 4 | 5 |
|---|---|---|---|
| 2 | 3 | 6 | 7 |

FIG. 3

DMRS PORT INDICATION METHOD AND APPARATUS

CROSS-REFERENCE TO RELATED APPLICATIONS

This application is a continuation of U.S. patent application Ser. No. 17/587,417, filed on Jan. 28, 2022, which is a continuation of International Application No. PCT/CN2020/105567, filed on Jul. 29, 2020. The International Application claims priority to Chinese Patent Application No. 201910696565.0, filed on Jul. 30, 2019. All of the aforementioned patent applications are hereby incorporated by reference in their entireties.

TECHNICAL FIELD

This application relates to the field of communication technologies, and in particular, to a demodulation reference signal (demodulation reference signal, DMRS) port indication method and an apparatus.

BACKGROUND

When scheduling data, for example, scheduling physical downlink shared channel (physical downlink shared channel, PDSCH) data, a network device needs to indicate a corresponding DMRS port, including a quantity of DMRS ports and a DMRS port number, where DMRS ports corresponding to different DMRS port numbers are orthogonal. The quantity of DMRS ports is equal to a quantity of transport layers of the PDSCH data. If different terminal devices occupy a same time-frequency resource to receive the PDSCH data, the network device needs to allocate different DMRS port numbers to ensure that DMRS ports are orthogonal.

Currently, a DMRS is classified into two types, and a length of orthogonal frequency division multiplexing (orthogonal frequency division multiple, OFDM) symbols occupied by a front-loaded DMRS may be 1 or 2. The front-loaded DMRS occupies a start location of the PDSCH. For type 1, when a quantity of symbols is 2, DMRS ports 0, 1, 4, and 5 belong to a code division multiplexing (code domain multiplexing, CDM) group 1, and DMRS ports 2, 3, 6, and 7 belong to a CDM group 2; when a quantity of symbols is 1, DMRS ports 0 and 1 belong to a CDM group 1, and DMRS ports 2 and 3 belong to a CDM group 2. A DMRS of type 1 supports a maximum of eight layers of transmission. For example, a terminal device 1 using four layers is paired with a terminal device 2 using four layers, or the terminal device 1 to a terminal device 8 each using one layer are paired with each other. In addition, the existing protocol specifies the following content.

For type 2, when a quantity of symbols is 2, DMRS ports 0, 1, 6, and 7 belong to a CDM group 1, DMRS ports 2, 3, 8, and 9 belong to a CDM group 2, and DMRS ports 4, 5, 10, and 11 belong to a CDM group 3. A DMRS of type 2 supports a maximum of 12 layers of transmission.

However, currently, in non-coherent transmission (non-coherent joint transmission, NC-JT) in a coordinated multipoint transmission (coordinated multiple points transmission/reception, CoMP) mode, DMRS ports corresponding to different network devices need to occupy different CDM groups. A combination of DMRS port indications in the existing protocol cannot meet NC-JT transmission. Further, the combination of DMRS port indications in the existing protocol cannot indicate different NC-JT transmission mechanisms. For example, the NC-JT transmission may use spatial multiplexing, time/frequency division multiplexing, or both spatial multiplexing and time/frequency division multiplexing. A DMRS port needs to be used to indicate a transmission mechanism used for current transmission.

SUMMARY

This application provides a DMRS port indication method and an apparatus, to meet NC-JT transmission.

According to a first aspect, this application provides a DMRS port indication method, and the method includes: A network device determines DMRS port indication information, and sends the DMRS port indication information. The DMRS port indication information is used to indicate a DMRS port set, the DMRS port set is one of a plurality of DMRS port sets, DMRS ports included in at least one of the plurality of DMRS port sets belong to a plurality of CDM groups, and a quantity of codewords corresponding to each of the plurality of DMRS port sets is 1. A part or all of the plurality of DMRS port sets are first DMRS port sets, and each first DMRS port set includes at least a DMRS port with a largest port number in a first CDM group and a DMRS port with a largest port number in a second CDM group.

According to the foregoing method, a DMRS port indicated by the network device to a terminal device can meet NC-JT transmission.

In a possible design, a DMRS port belonging to the first CDM group and a port of a first RS are QCL, a DMRS port belonging to the second CDM group and a port of a second RS are QCL, and the first RS is different from the second RS.

In a possible design, the first DMRS port set may include at least three of the following:

a quantity of DMRS ports belonging to the first CDM group in the first DMRS port set is equal to 1, and a quantity of DMRS ports belonging to the second CDM group in the first DMRS port set is equal to 1;

a quantity of DMRS ports belonging to the first CDM group in the first DMRS port set is equal to 2, where the two DMRS ports belonging to the first CDM group are two DMRS ports with largest port numbers in the first CDM group; and a quantity of DMRS ports belonging to the second CDM group in the first DMRS port set is equal to 1;

a quantity of DMRS ports belonging to the first CDM group in the first port set is equal to 2, where the two DMRS ports belonging to the first CDM group are two DMRS ports with largest port numbers in the first CDM group; and a quantity of DMRS ports belonging to the second CDM group in the first DMRS port set is equal to 2, where the two DMRS ports belonging to the second CDM group are two DMRS ports with largest port numbers in the second CDM group; or a quantity of DMRS ports belonging to the second CDM group in the first DMRS port set is equal to 2, where the two DMRS ports belonging to the second CDM group are two DMRS ports with largest port numbers in the second CDM group; and a quantity of DMRS ports belonging to the first CDM group in the first DMRS port set is equal to 1.

In a possible design, the first DMRS port set may further include at least one of the following:

the quantity of DMRS ports belonging to the first CDM group in the first DMRS port set is equal to 3, where the three DMRS ports belonging to the first CDM group are three DMRS ports with largest port numbers in the first CDM group; and the quantity of DMRS ports belonging to the second CDM group in the first DMRS port set is equal to 1; or the quantity of DMRS ports belonging to the second CDM group in the first DMRS port set is equal to 3, where the three DMRS ports belonging to the second CDM group are three DMRS ports with largest port numbers in the second CDM group; and the quantity of DMRS ports belonging to the first CDM group in the first DMRS port set is equal to 1.

In a possible design, when the DMRS port set indicated by the DMRS port indication information is the first DMRS port set, transmission on a corresponding PDSCH is multi-user multiple-input multiple-output (MU-MIMO) transmission.

In a possible design, when the DMRS port set indicated by the DMRS port indication information is the first DMRS port set and a quantity of corresponding front-loaded DMRS symbols is 1, transmission on a corresponding PDSCH is single-user multiple-input multiple-output (SU-MIMO) transmission; or when the DMRS port set indicated by the DMRS port indication information is the first DMRS port set and a quantity of corresponding front-loaded DMRS symbols is 2, transmission on a corresponding PDSCH is multi-user multiple-input multiple-output (MU-MIMO) transmission.

According to a second aspect, this application provides a DMRS port indication method, and the method includes: A terminal device receives DMRS port indication information, and determines a DMRS port based on the DMRS port indication information. The DMRS port indication information is used to indicate a DMRS port set, the DMRS port set is one of a plurality of DMRS port sets, DMRS ports included in at least one of the plurality of DMRS port sets belong to a plurality of CDM groups, and a quantity of codewords corresponding to each of the plurality of DMRS port sets is 1. A part or all of the plurality of DMRS port sets are first DMRS port sets, and each first DMRS port set includes at least a DMRS port with a largest port number in a first CDM group and a DMRS port with a largest port number in a second CDM group. The foregoing method can meet NC-JT transmission.

In a possible design, a DMRS port belonging to the first CDM group and a port of a first RS are QCL, a DMRS port belonging to the second CDM group and a port of a second RS are QCL, and the first RS is different from the second RS.

In a possible design, the first DMRS port set may include at least three of the following:

a quantity of DMRS ports belonging to the first CDM group in the first DMRS port set is equal to 1, and a quantity of DMRS ports belonging to the second CDM group in the first DMRS port set is equal to 1;

a quantity of DMRS ports belonging to the first CDM group in the first DMRS port set is equal to 2, where the two DMRS ports belonging to the first CDM group are two DMRS ports with largest port numbers in the first CDM group; and a quantity of DMRS ports belonging to the second CDM group in the first DMRS port set is equal to 1;

a quantity of DMRS ports belonging to the first CDM group in the first port set is equal to 2, where the two DMRS ports belonging to the first CDM group are two DMRS ports with largest port numbers in the first CDM group; and a quantity of DMRS ports belonging to the second CDM group in the first DMRS port set is equal to 2, where the two DMRS ports belonging to the second CDM group are two DMRS ports with largest port numbers in the second CDM group; or a quantity of DMRS ports belonging to the second CDM group in the first DMRS port set is equal to 2, where the two DMRS ports belonging to the second CDM group are two DMRS ports with largest port numbers in the second CDM group; and a quantity of DMRS ports belonging to the first CDM group in the first DMRS port set is equal to 1.

In a possible design, the first DMRS port set may further include at least one of the following:

the quantity of DMRS ports belonging to the first CDM group in the first DMRS port set is equal to 3, where the three DMRS ports belonging to the first CDM group are three DMRS ports with largest port numbers in the first CDM group; and the quantity of DMRS ports belonging to the second CDM group in the first DMRS port set is equal to 1; or the quantity of DMRS ports belonging to the second CDM group in the first DMRS port set is equal to 3, where the three DMRS ports belonging to the second CDM group are three DMRS ports with largest port numbers in the second CDM group; and the quantity of DMRS ports belonging to the first CDM group in the first DMRS port set is equal to 1.

In a possible design, when the DMRS port set indicated by the DMRS port indication information is the first DMRS port set, transmission on a corresponding PDSCH is multi-user multiple-input multiple-output (MU-MIMO) transmission.

In a possible design, when the DMRS port set indicated by the DMRS port indication information is the first DMRS port set and a quantity of corresponding front-loaded DMRS symbols is 1, transmission on a corresponding PDSCH is single-user multiple-input multiple-output (SU-MIMO) transmission; or when the DMRS port set indicated by the DMRS port indication information is the first DMRS port set and a quantity of corresponding front-loaded DMRS symbols is 2, transmission on a corresponding PDSCH is multi-user multiple-input multiple-output (MU-MIMO) transmission.

According to a third aspect, this application provides a DMRS port indication method, and the method includes: A network device determines DMRS port indication information, and sends the DMRS port indication information. The DMRS port indication information is used to indicate a DMRS port set, and the DMRS port set is one of a plurality of DMRS port sets; a part of the plurality of DMRS port sets are first DMRS port sets, and DMRS ports included in each first DMRS port set belong to a plurality of CDM groups; a part of the plurality of DMRS port sets are second DMRS port sets, and at least one DMRS port included in each second DMRS port set belongs to a same CDM group; and the first DMRS port set is used to indicate that QCL information used to transmit corresponding PDSCHs in different time units or frequency domain units is the same, and the second DMRS port set is used to indicate that QCL information used to transmit corresponding PDSCHs in different time units or frequency domain units is different.

According to the foregoing method, different high-reliability transmission mechanisms may be indicated without increasing indication overheads, so as to ensure that a terminal device can correctly receive data based on the different transmission mechanisms.

In a possible design, the network device further determines QCL indication information, where the QCL indication information indicates at least two pieces of QCL information.

In a possible design, when the DMRS port set indicated by the DMRS port indication information is the first DMRS port set, the at least two pieces of QCL information are used to receive a DMRS and corresponding data in each of the different time units or frequency domain units; when the DMRS port set indicated by the DMRS port indication information is the second DMRS port set, one of the at least two pieces of QCL information is used to receive a DMRS and corresponding data in each of the different time units or frequency domain units.

In a possible design, the different time units are located in a same slot (slot), and each of the different time units includes a same quantity of OFDM symbols.

In a possible design, the different time units are sequentially arranged in time domain. A time interval between adjacent time units is N OFDM symbols, where N is a natural number.

In a possible design, the different time units are located in different slots (slots), and the different time units include a same quantity of OFDM symbols in different slots.

In a possible design, configuration signaling is used to indicate a quantity of time units.

In a possible design, when the DMRS port set indicated by the DMRS port indication information is the second DMRS port set, one piece of QCL information is used to receive a DMRS and corresponding data in each time unit, and different QCL information is used to receive the DMRS and corresponding data in the adjacent time units.

In a possible design, when the DMRS port set indicated by the DMRS port indication information is the first DMRS port set, a DMRS port belonging to a first CDM group and a DMRS port belonging to a second CDM group in each time unit correspond to different QCL information.

In a possible design, the different frequency domain units are located in a same system bandwidth (bandwidth part (bandwidth part, BWP)), or are located in a same carrier (component carrier, CC).

In a possible design, a DMRS and corresponding data are sent in each frequency domain unit in a same beamforming manner.

In a possible design, when the DMRS port set indicated by the DMRS port indication information is the second DMRS port set, one piece of QCL information is used to receive a DMRS and corresponding data in each frequency domain unit. Optionally, different QCL information is used to receive DMRSs and corresponding data in adjacent frequency domain units.

In a possible design, when the DMRS port set indicated by the DMRS port indication information is the first DMRS port set, a DMRS port belonging to a first CDM group and a DMRS port belonging to a second CDM group in each frequency domain unit correspond to different QCL information.

In a possible design, the PDSCHs in the different time units or frequency domain units correspond to one redundancy version or codeword of a same TB.

In a possible design, the PDSCHs in the different time units or frequency domain units correspond to different redundancy versions or codewords of a same TB.

In a possible design, when downlink control information (downlink control information, DCI) for scheduling the TB indicates that only one codeword is activated, it indicates that the PDSCHs in the different time units or frequency domain units correspond to one redundancy version or codeword of a same TB. Specifically, the DCI includes two modulation and coding scheme (modulation and coding scheme, MCS) indication fields and two redundancy version RV indication fields. When the DCI indicates that only one codeword is activated, the first MCS indication field and the first RV indication field are used to indicate an MCS and an RV of the TB, and the second MCS indication field and the second RV indication field are used to indicate to deactivate the second codeword, for example, indicate an MCS index value 26 and an RV index value 1.

In a possible design, when DCI for scheduling the TB indicates that two codewords are activated, it indicates that the PDSCHs in the different time units or frequency domain units correspond to different redundancy versions or codewords of a same TB. Specifically, the DCI includes two modulation and coding scheme MCS indication fields and two redundancy version RV indication fields. When the DCI indicates that two codewords are activated, the first MCS indication field and the first RV indication field are used to indicate an MCS and an RV of the TB, and the second MCS indication field and the second RV indication field are used to indicate another MCS and another RV of the TB, where the first MCS indication field corresponds to a part of frequency domain units, and the second MC S indication field corresponds to a frequency domain unit other than the part of frequency domain units. Optionally, a maximum quantity of front-loaded DMRS symbols is set to 1.

In a possible design, a maximum quantity of codewords is set to 2.

In a possible design, when the DMRS port set indicated by the DMRS port indication information is the first DMRS port set or the second DMRS port set, transmission on a corresponding PDSCH is single-user multiple-input multiple-output (SU-MIMO) transmission. The first DMRS port set includes a DMRS port set {0, 2}, and the second DMRS port set includes a DMRS port set {0}, or further includes a DMRS port set {0, 1}.

In a possible design, when the DMRS port set indicated by the DMRS port indication information is the first DMRS port set, transmission on a corresponding PDSCH is multi-user multiple-input multiple-output (MU-MIMO) transmission. The second DMRS port set includes DMRS port sets {0} and {1}, or further includes a DMRS port set {0, 1}.

According to a fourth aspect, this application provides a DMRS port indication method, and the method includes: A terminal device receives DMRS port indication information, and determines a DMRS port based on the DMRS port indication information. The DMRS port indication information is used to indicate a DMRS port set, and the DMRS port set is one of a plurality of DMRS port sets; a part of the plurality of DMRS port sets are first DMRS port sets, and DMRS ports included in each first DMRS port set belong to a plurality of CDM groups; a part of the plurality of DMRS port sets are second DMRS port sets, and at least one DMRS port included in each second DMRS port set belongs to a same CDM group; and the first DMRS port set is used to indicate that QCL information used to transmit corresponding PDSCHs in different time units or frequency domain units is different, and the second DMRS port set is used to indicate that QCL information used to transmit corresponding PDSCHs in different time units or frequency domain units is the same.

According to the foregoing method, different high-reliability transmission mechanisms may be indicated without increasing indication overheads, so as to ensure that the terminal device can correctly receive data based on the different transmission mechanisms.

In a possible design, the terminal device further receives QCL indication information, where the QCL indication information indicates at least two pieces of QCL information.

In a possible design, the terminal device further determines mapping relationships between different time units or frequency domain units and QCL information based on the DMRS port indication information.

In a possible design, when the DMRS port set indicated by the DMRS port indication information is the first DMRS port set, the at least two pieces of QCL information are used to receive a DMRS and corresponding data in each of the different time units or frequency domain units; when the DMRS port set indicated by the DMRS port indication information is the second DMRS port set, one of the at least two pieces of QCL information is used to receive a DMRS and corresponding data in each of the different time units or frequency domain units.

In a possible design, the different time units are located in a same slot (slot), and each of the different time units includes a same quantity of OFDM symbols.

In a possible design, the different time units are sequentially arranged in time domain. A time interval between adjacent time units is N OFDM symbols, where N is a natural number.

In a possible design, the different time units are located in different slots (slots), and the different time units include a same quantity of OFDM symbols in different slots.

In a possible design, configuration signaling is used to indicate a quantity of time units.

In a possible design, when the DMRS port set indicated by the DMRS port indication information is the second DMRS port set, one piece of QCL information is used to receive a DMRS and corresponding data in each time unit, and different QCL information is used to receive the DMRS and corresponding data in the adjacent time units.

In a possible design, when the DMRS port set indicated by the DMRS port indication information is the first DMRS port set, a DMRS port belonging to a first CDM group and a DMRS port belonging to a second CDM group in each time unit correspond to different QCL information.

In a possible design, the different frequency domain units are located in a same system bandwidth (bandwidth part (bandwidth part, BWP)), or are located in a same carrier (component carrier, CC).

In a possible design, a DMRS and corresponding data are sent in each frequency domain unit in a same beamforming manner.

In a possible design, when the DMRS port set indicated by the DMRS port indication information is the second DMRS port set, one piece of QCL information is used to receive a DMRS and corresponding data in each frequency domain unit. Optionally, different QCL information is used to receive DMRSs and corresponding data in adjacent frequency domain units.

In a possible design, when the DMRS port set indicated by the DMRS port indication information is the first DMRS port set, a DMRS port belonging to a first CDM group and a DMRS port belonging to a second CDM group in each frequency domain unit correspond to different QCL information.

In a possible design, the PDSCHs in the different time units or frequency domain units correspond to one redundancy version or codeword of a same TB.

In a possible design, the PDSCHs in the different time units or frequency domain units correspond to different redundancy versions or codewords of a same TB.

In a possible design, when downlink control information DCI for scheduling the TB indicates that only one codeword is activated, it indicates that the PDSCHs in the different time units or frequency domain units correspond to one redundancy version or codeword of a same TB. Specifically, the DCI includes two modulation and coding scheme MCS indication fields and two redundancy version RV indication fields. When the DCI indicates that only one codeword is activated, the first MCS indication field and the first RV indication field are used to indicate an MCS and an RV of the TB, and the second MCS indication field and the second RV indication field are used to indicate to deactivate the second codeword, for example, indicate an MCS index value 26 and an RV index value 1.

In a possible design, when DCI for scheduling the TB indicates that two codewords are activated, it indicates that the PDSCHs in the different time units or frequency domain units correspond to different redundancy versions or codewords of a same TB. Specifically, the DCI includes two modulation and coding scheme MCS indication fields and two redundancy version RV indication fields. When the DCI indicates that two codewords are activated, the first MCS indication field and the first RV indication field are used to indicate an MCS and an RV of the TB, and the second MCS indication field and the second RV indication field are used to indicate another MCS and another RV of the TB, where the first MCS indication field corresponds to a part of frequency domain units, and the second MCS indication field corresponds to a frequency domain unit other than the part of frequency domain units. Optionally, a maximum quantity of front-loaded DMRS symbols is set to 1.

In a possible design, a maximum quantity of codewords is set to 2.

In a possible design, when the DMRS port set indicated by the DMRS port indication information is the first DMRS port set or the second DMRS port set, transmission on a corresponding PDSCH is single-user multiple-input multiple-output (SU-MIMO) transmission. The first DMRS port set includes a DMRS port set {0, 2}, and the second DMRS port set includes a DMRS port set {0}, or further includes a DMRS port set {0, 1}.

In a possible design, when the DMRS port set indicated by the DMRS port indication information is the first DMRS port set, transmission on a corresponding PDSCH is multi-user multiple-input multiple-output (MU-MIMO) transmission. The second DMRS port set includes DMRS port sets {0} and {1}, or further includes a DMRS port set {0, 1}.

According to a fifth aspect, this application further provides a communication apparatus. The communication apparatus may be a network device, and has a function of implementing the network device in the method example according to the first aspect. The function may be implemented by hardware, or may be implemented by hardware executing corresponding software. The hardware or software includes one or more modules corresponding to the function.

In a possible design, a structure of the communication apparatus includes a processing unit and a transceiver unit. These units may perform corresponding functions in the method example according to the first aspect. For details, refer to the detailed descriptions in the method example. Details are not described herein again.

In a possible design, the structure of the communication apparatus includes a transceiver and a processor, and optionally, may further include a memory. The transceiver is configured to: receive and send data, and communicate and interact with another device in a system. The processor is configured to support the communication apparatus in performing a corresponding function of the network device in the method according to the first aspect. The memory is coupled to the processor, and stores program instructions and data that are necessary for the communication apparatus.

According to a sixth aspect, this application further provides a communication apparatus. The communication apparatus may be a terminal device, and has a function of implementing the terminal device in the method example according to the second aspect. The function may be implemented by hardware, or may be implemented by hardware executing corresponding software. The hardware or software includes one or more modules corresponding to the function.

In a possible design, a structure of the communication apparatus includes a processing unit and a transceiver unit. These units may perform corresponding functions in the method example according to the second aspect. For details, refer to the detailed descriptions in the method example. Details are not described herein again.

In a possible design, the structure of the communication apparatus includes a transceiver and a processor, and optionally, may further include a memory. The transceiver is configured to: receive and send data, and communicate and interact with another device in a system. The processor is configured to support the communication apparatus in performing a corresponding function of the terminal device in the method according to the second aspect. The memory is coupled to the processor, and stores program instructions and data that are necessary for the communication apparatus.

According to a seventh aspect, this application further provides a communication apparatus. The communication apparatus may be a network device, and has a function of implementing the network device in the method example according to the third aspect. The function may be implemented by hardware, or may be implemented by hardware executing corresponding software. The hardware or software includes one or more modules corresponding to the function.

In a possible design, a structure of the communication apparatus includes a processing unit and a transceiver unit. These units may perform corresponding functions in the method example according to the third aspect. For details, refer to the detailed descriptions in the method example. Details are not described herein again.

In a possible design, the structure of the communication apparatus includes a transceiver and a processor, and optionally, may further include a memory. The transceiver is configured to: receive and send data, and communicate and interact with another device in a system. The processor is configured to support the communication apparatus in performing a corresponding function of the network device in the method according to the third aspect. The memory is coupled to the processor, and stores program instructions and data that are necessary for the communication apparatus.

According to an eighth aspect, this application further provides a communication apparatus. The communication apparatus may be a terminal device, and has a function of implementing the terminal device in the method example according to the fourth aspect. The function may be implemented by hardware, or may be implemented by hardware executing corresponding software. The hardware or software includes one or more modules corresponding to the function.

In a possible design, a structure of the communication apparatus includes a processing unit and a transceiver unit. These units may perform corresponding functions in the method example according to the fourth aspect. For details, refer to the detailed descriptions in the method example. Details are not described herein again.

In a possible design, the structure of the communication apparatus includes a transceiver and a processor, and optionally, may further include a memory. The transceiver is configured to: receive and send data, and communicate and interact with another device in a system. The processor is configured to support the communication apparatus in performing a corresponding function of the terminal device in the method according to the fourth aspect. The memory is coupled to the processor, and stores program instructions and data that are necessary for the communication apparatus.

According to a ninth aspect, this application further provides a communication system. The communication system includes the terminal device and the network device mentioned in at least one of the foregoing designs. Further, the network device in the communication system may perform any method performed by the network device in the foregoing methods, and the terminal device in the communication system may perform any method performed by the terminal device in the foregoing methods.

According to a tenth aspect, this application provides a computer storage medium. The computer storage medium stores computer-executable instructions, and when being invoked by a computer, the computer-executable instructions are used to enable the computer to perform any one of the foregoing methods.

According to an eleventh aspect, this application provides a computer program product including instructions. When the computer program product runs on a computer, the computer is enabled to perform any one of the foregoing methods.

According to a twelfth aspect, this application provides a chip. The chip is coupled to a memory, and is configured to read and execute program instructions stored in the memory, to implement any one of the foregoing methods.

BRIEF DESCRIPTION OF DRAWINGS

FIG. 3 is a schematic diagram of a CDM group according to this application;

DESCRIPTION OF EMBODIMENTS

The following further describes in detail this application with reference to the accompanying drawings.

Embodiments of this application provide a DMRS port indication method and an apparatus, to meet NC-JT transmission. The method and the apparatus described in this application are based on a same inventive concept. Because problem resolving principles of the method and the apparatus are similar, mutual reference may be made to implementations of the apparatus and the method. Repeated parts are not described again.

In the description of this application, terms such as "first" and "second" are used only for purposes of distinguishing descriptions, but cannot be understood as indicating or implying relative importance, or as indicating or implying a sequence.

To describe technical solutions in the embodiments of this application more clearly, the following describes in detail the DMRS port indication method and the apparatus provided in the embodiments of this application with reference to the accompanying drawings.

Figure 1:
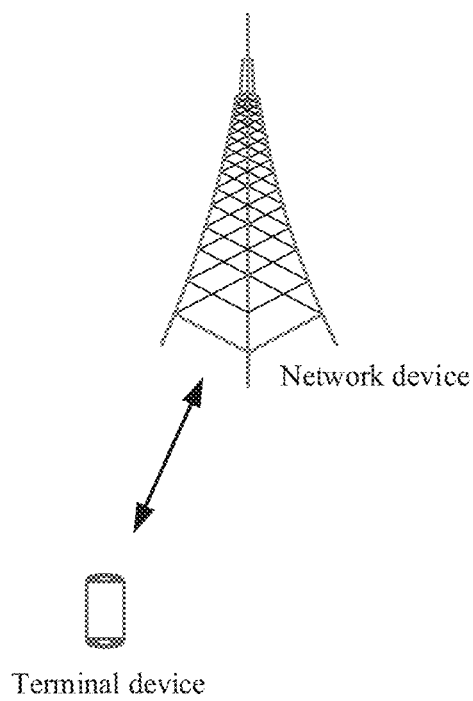
FIG. 1 is a schematic architectural diagram of a communication system according to this application.

FIG. 1 shows an architecture of a possible communication system applicable to a DMRS port indication method according to an embodiment of this application. The architecture of the communication system includes a network device and a terminal device.

The network device is a device that has a wireless transceiver function or a chip that can be disposed in the network device. The network device includes but is not limited to a gNB, a radio network controller (radio network controller, RNC), a NodeB (NodeB, NB), a base station controller (base station controller, BSC), a base transceiver station (base transceiver station, BTS), a home evolved NodeB (for example, a home evolved NodeB, or a home NodeB, HNB), a baseband unit (baseband unit, BBU), an access point (access point, AP) in a wireless fidelity (wireless fidelity, WIFI) system, a wireless relay node, a wireless backhaul node, a transmission and reception point (transmission and reception point, TRP, or transmission point, TP). The network device may alternatively be a network node that constitutes a gNB or a transmission point, for example, a baseband unit (BBU), or a distributed unit (distributed unit, DU).

In some deployments, the gNB may include a centralized unit (centralized unit, CU) and the DU. The gNB may further include a radio unit (radio unit, RU). The CU implements a part of functions of the gNB, and the DU implements a part of functions of the gNB. For example, the CU implements functions of a radio resource control (radio resource control, RRC) layer and a packet data convergence protocol (packet data convergence protocol, PDCP) layer, while the DU implements functions of a radio link control (radio link control, RLC) layer, a media access control (media access control, MAC) layer, and a physical (physical, PHY) layer. Information at the RRC layer finally becomes information at the PHY layer or is transformed from information at the PHY layer. Therefore, in such an architecture, it may be considered that higher layer signaling such as RRC layer signaling or PHCP layer signaling is sent by the DU or is sent by the DU and the RU. It can be understood that the network device may be a CU node, a DU node, or a device including a CU node and a DU node. In addition, the CU may be classified as a network device in an access network RAN, or the CU may be classified as a network device in a core network CN. This is not limited herein.

The terminal device may also be referred to as user equipment (user equipment, UE), an access terminal, a subscriber unit, a subscriber station, a mobile station, a remote station, a remote terminal, a mobile device, a user terminal, a terminal, a wireless communication device, a user agent, or a user apparatus. The terminal device in the embodiments of this application may be a mobile phone (mobile phone), a tablet (Pad), a computer having a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. A terminal device having a wireless transceiver function and a chip that may be disposed in the terminal device are collectively referred to as terminal devices in this application.

It should be noted that the communication system shown in FIG. 1 may be but is not limited to a 5th generation (5th Generation, 5G) system, for example, a new radio access technology (new radio access technology, NR). Optionally, the method in the embodiments of this application is further applicable to various future communication systems, for example, a 6G system or another communication network.

To facilitate understanding of the embodiments of this application, the following first describes concepts and basic knowledge related to the embodiments of this application.

(1) DMRS Port Indication:

When scheduling data, for example, scheduling PDSCH data, the network device needs to indicate a corresponding DMRS port, including a quantity of DMRS ports and a DMRS port number. Physical resources occupied by DMRS ports corresponding to different DMRS port numbers are orthogonal. The physical resource includes one or more of a space resource, a time domain resource, and a frequency domain resource. The quantity of DMRS ports is equal to a quantity of transport layers of the PDSCH data, the DMRS ports are in a one-to-one correspondence with the transport layers, and channel estimation needs to be performed on a corresponding DMRS port for demodulating a transport layer. If different terminal devices occupy a same time-frequency resource to transmit the PDSCH data, the network device needs to allocate different DMRS port numbers to ensure that DMRS ports are orthogonal. For example, a DMRS pattern (pattern) in NR is classified into two types (types). In each type, a length of OFDM symbols occupied by a DMRS may be 1 or 2. The two types of DMRSs may be shown in FIG. 2.

Figure 2:
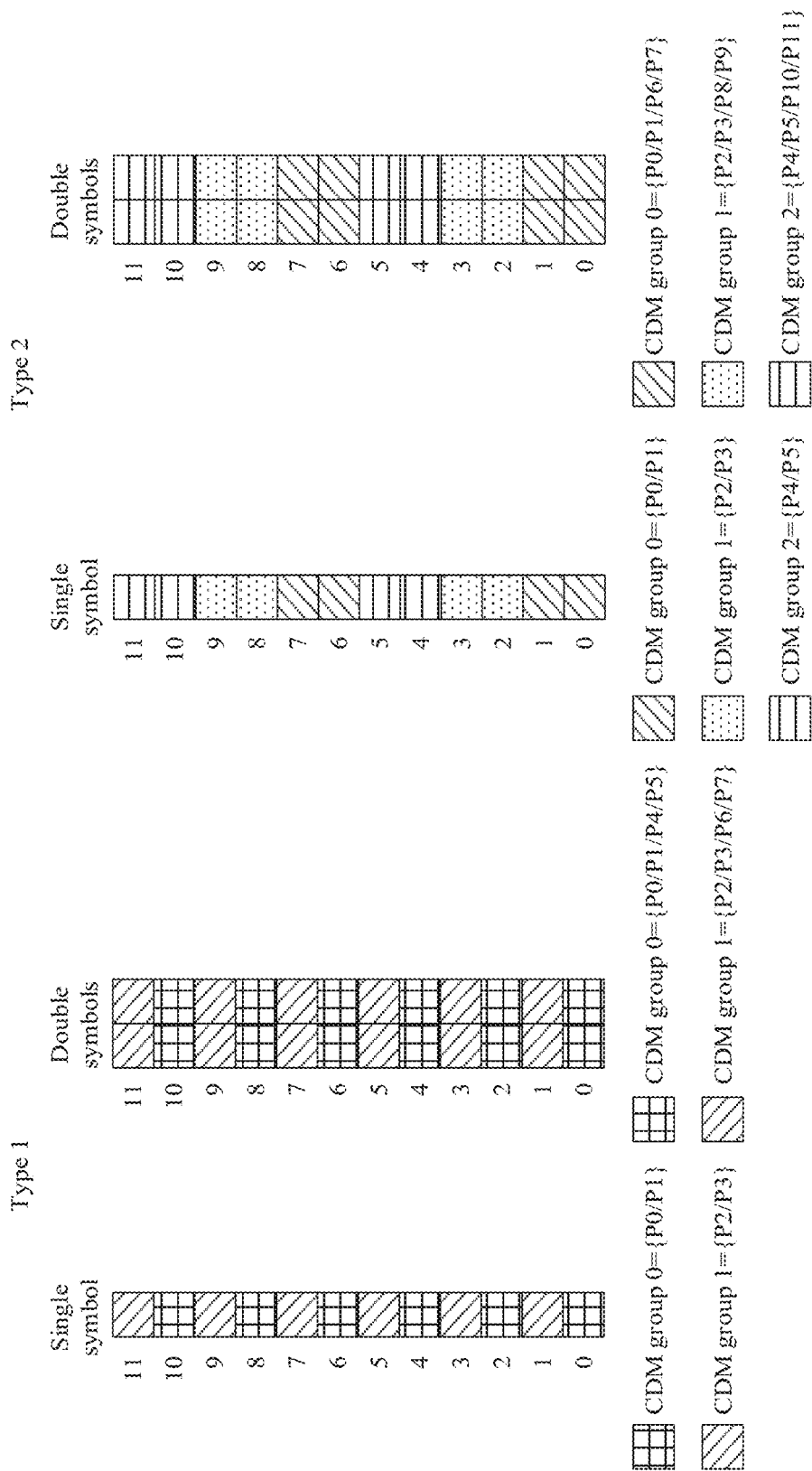
FIG. 2 is a schematic diagram of a DMRS type according to this application.

For type 1, the left two figures in FIG. 2 respectively show two cases: A length of OFDM symbols (also referred to as a quantity of symbols) occupied by a DMRS is 1, and a length of OFDM symbols occupied by a DMRS is 2. A maximum length of OFDM symbols occupied by a front-loaded DMRS is indicated by using radio resource control (radio resource control, RRC). Each maximum length of OFDM symbols corresponds to a DMRS port indication table, as shown in the following Tables 1 and 2. In Table 1, the maximum quantity of OFDM symbols is 1. In Table 2, the maximum quantity of OFDM symbols is 2. In addition, whether the length of OFDM symbols occupied by the DMRS is 1 or 2 may be dynamically indicated. DMRS ports 0, 1, 4, and 5 belong to a CDM group 1, and DMRS ports 2, 3, 6, and 7 belong to a CDM group 2. Specifically, the CDM group 1 and the CDM group 2 may exist as shown in the schematic diagram in FIG. 3. For example, DMRS ports that respectively belong to the CDM group 1 and the CDM group 2 may occupy different time-frequency resources, but DMRS ports in each of the two CDM groups occupy a same time-frequency resource, and different DMRS ports are distinguished by using different codes, for example, by using Walsh-Hadamard codes or orthogonal cover codes (OCCs). When the maximum quantity of symbols occupied by the front-loaded DMRS is 1, one codeword is enabled accordingly. When the maximum quantity of symbols occupied by the front-loaded DMRS is 2, in each table, the left part corresponds to a case in which one codeword is enabled (the maximum quantity of transport layers is less than or equal to 4), and the right part corresponds to a case in which two codewords are enabled (the maximum quantity of transport layers is greater than 4). One codeword corresponds to one independent modulation and coding scheme (MCS). A DMRS of type 1 supports a maximum of eight layers of paired transmission. For example, a terminal device 1 using four layers is paired with a terminal device 2 using four layers, or the terminal device 1 to a terminal device 8 each using one layer are paired with each other.

In the tables, a quantity of CDM groups without data is used to indicate a frequency domain resource that can be used to carry data on a symbol occupied by a DMRS. For example, if the quantity is 1, it indicates that the DMRS may occupy a frequency domain resource corresponding to the CDM group 1, but a frequency domain resource corresponding to the CDM group 2 is used to transmit data. For example, if the quantity is 2, it indicates that the DMRS may occupy frequency domain resources corresponding to the CDM groups 1 and 2, and because the CDM groups 1 and 2 occupy all frequency domain resources on a DMRS symbol, the DMRS symbol is not used to transmit data.

TABLE 1

DMRS port indication type 1 and maximum quantity
of symbols occupied by a front-loaded DMRS being 1
One codeword: A codeword 0 is enabled, and a codeword 1 is disabled

| Bit field value | Quantity of CDM groups without data | DMRS port |
|---|---|---|
| 0 | 1 | 0 (one layer) |
| 1 | 1 | 1 |
| 2 | 1 | 0, 1 (two layers) |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 (three layers) |
| 10 | 2 | 0-3 (four layers) |
| 11 | 2 | 0, 2 |
| 12-15 | Reserved | Reserved |

TABLE 2

DMRS port indication type 1 and maximum quantity of
symbols occupied by a front-loaded DMRS being 2

| One codeword: A codeword 0 is enabled, and a codeword 1 is disabled | | | | Two codewords: The codeword 0 is enabled, and the codeword 1 is enabled | | | |
|---|---|---|---|---|---|---|---|
| Bit field value | Quantity of CDM groups without data | DMRS port | Length of DMRS symbols | Bit field value | CDM group without data | DMRS port | Length of DMRS symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | Reserved | Reserved | Reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |

TABLE 2-continued

DMRS port indication type 1 and maximum quantity of symbols occupied by a front-loaded DMRS being 2

| | One codeword: A codeword 0 is enabled, and a codeword 1 is disabled | | | Two codewords: The codeword 0 is enabled, and the codeword 1 is enabled | | | |
|---|---|---|---|---|---|---|---|
| Bit field value | Quantity of CDM groups without data | DMRS port | Length of DMRS symbols | Bit field value | CDM group without data | DMRS port | Length of DMRS symbols |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

Type 2 is shown in the right two figures in FIG. 2. Similarly, there are also two cases: A length of OFDM symbols occupied by a DMRS is 1, and a length of OFDM symbols occupied by a DMRS is 2. In addition, DMRS ports 0, 1, 6, and 7 belong to a CDM group 1, DMRS ports 2, 3, 8, and 9 belong to a CDM group 2, and DMRS ports 4, 5, 10, and 11 belong to a CDM group 3. A DMRS of type 2 supports a maximum of 12 layers of paired transmission. Similarly, each length of OFDM symbols corresponds to a DMRS port indication table, as shown in the following Tables 3 and 4.

TABLE 3

DMRS port indication type 2 and maximum length of symbols occupied by a DMRS being 1

| One codeword: A codeword 0 is enabled, and a codeword 1 is disabled | | | Two codewords: The codeword 0 is enabled, and the codeword 1 is enabled | | |
|---|---|---|---|---|---|
| Bit field value | CDM group without data | DMRS port | Bit field value | CDM group without data | DMRS port |
| 0 | 1 | 0 | 0 | 3 | 0-4 |
| 1 | 1 | 1 | 1 | 3 | 0-5 |
| 2 | 1 | 0, 1 | 2-31 | Reserved | Reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

TABLE 4

| DMRS port indication type 2 and maximum length of symbols occupied by a DMRS being 2 | | | | | | | |
|---|---|---|---|---|---|---|---|
| One codeword: A codeword 0 is enabled, and a codeword 1 is disabled | | | | Two codewords: The codeword 0 is enabled, and the codeword 1 is enabled | | | |
| Bit field value | CDM group without data | DMRS port | Length of DMRS symbols | Bit field value | CDM group without data | DMRS port | Length of DMRS symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

(2) Coordinated Multipoint Transmission Mechanism:

In downlink transmission, a terminal device may simultaneously communicate with at least one network device, that is, simultaneously receive data from a plurality of network devices. This transmission mode is referred to as coordinated multipoint transmission (coordinated multiple points transmission/reception, CoMP). The at least one network device forms a coordinated set to simultaneously communicate with the terminal device. Network devices in the coordinated set may be separately connected to different control nodes, and the control nodes may exchange information with each other, for example, exchange scheduling policy information to achieve an objective of coordinated transmission. Alternatively, network devices in the coordinated set are all connected to a same control node. The control node receives channel state information (for example, CSI or an RSRP) that is reported by the terminal device and that is collected by the network devices in the coordinated set, performs scheduling on all the terminal devices in the coordinated set based on channel state information of all the terminal devices in the coordinated set, and then exchanges a scheduling policy to the network device connected to the control node. Then, each network device notifies a terminal device of the network device by using DCI signaling carried on a PDCCH. According to a transmission policy of a plurality of network devices in the coordinated set for a terminal device, the CoMP transmission mode may include the following content.

Dynamic transmission point switching (dynamic point switching, DPS): For a dynamic change of a network device when a terminal device transmits data, a network device with a relatively good channel condition is selected as best as possible to perform data scheduling on the current terminal device, that is, a plurality of network devices transmit data for a terminal device in a time division manner.

Non-coherent joint transmission (non-coherent joint transmission, NC-JT): A plurality of network devices simultaneously transmit data for a terminal device, and independent precoding is performed on antennas of the plurality of network devices, to be specific, each network device independently selects an optimal precoding matrix to perform joint phase weighting and amplitude weighting between antennas of the network device. In this mechanism, phase calibration does not need to be performed on the antennas of the plurality of network devices.

There is a serving network device in the network devices in the coordinated set, for example, a serving base station (serving TRP)/serving cell (serving cell). A function of the serving base station is to make a scheduling decision to perform data communication on the terminal device, and perform MAC layer and physical layer communication with the terminal device, for example, determine time-frequency resources of a control channel (PDCCH) and a data channel (PUSCH/PDSCH) of the terminal device based on the scheduling decision, send DCI signaling on the PDCCH, send data on the PUSCH/PDSCH, and send a reference signal (reference signal, RS). In addition to the serving base station, another network device in the coordinated set is referred to as a coordinated base station (coordinate TRP)/coordinated cell (coordinate TRP). A function of the coordinated base station is to perform physical layer communication with the terminal device based on the scheduling decision of the serving base station, for example, send the DCI signaling on the PDCCH based on the scheduling decision of the serving base station, send the data on the PUSCH/PDSCH, and send the RS. For example, the serving base station is a TRP 1, the coordinated base station is a TRP 2, the TRP 1 serves as the serving base station to make a scheduling decision for the terminal device and send DCI. The DCI may indicate to schedule the TRP 1/TRP 2 to transmit data. That is, the DCI carries scheduling information of the two TRPs.

DMRS ports corresponding to PDSCHs transmitted by two TRPs need to occupy different CDM groups, and each CDM group/each PDSCH corresponds to one TCI state. The TCI state is used to indicate quasi-co-location (quasi-co-location, QCL) assumption information (also referred to as QCL information). The QCL assumption information is used to assist in describing receive side beamforming information and a receiving procedure of a terminal device. Four types of QCL assumption information are defined in an existing standard, and the four types of QCL assumption information are: QCL types (types) A including a Doppler shift (doppler shift), Doppler spread (doppler spread), an average channel delay (average delay), and delay spread (delay spread), QCL types B including a Doppler shift and Doppler spread, QCL types C including an average delay and a Doppler shift, and QCL types D including a spatial reception parameter (spatial rx parameter). In a conventional technology, to reduce QCL information indication overheads of the network device for the terminal device, a QCL information indication on the PDSCH or the PDCCH is to indicate that a DM-RS port of the PDCCH (or the PDSCH) and one or more reference signal resources meet a QCL assumption relationship, so that the QCL information can be obtained by using the associated one or more reference signal resources, and the PDSCH or the PDCCH may be received by using the information. For example, the reference signal may be a channel state information reference signal (channel state information reference signal, CSI-RS), and the DM-RS and the CSI-RS have a same QCL Type D assumption. In this case, the DM-RS and the CSI-RS have a same receive beam. Therefore, based on an associated reference signal resource index, the UE may obtain, through inference, information about a receive beam for receiving the PDCCH (or the PDSCH). These pieces of QCL information are spatial characteristic parameters, and describe spatial channel characteristics of antenna ports included in two associated reference signals. This helps the terminal device complete a receive side beamforming process or a receiving processing process based on the QCL information.

(3) The NC-JT Transmission Mechanism is Used to Support a Transmission Solution with High Data Transmission Reliability:

Solution 1: Transmit data by using a plurality of transmission ports, and the transmission ports correspond to different QCL information (that is, corresponds to different TRPs). A specific solution may be shown in FIG. 4a and FIG. 4b.

Figure 4A:
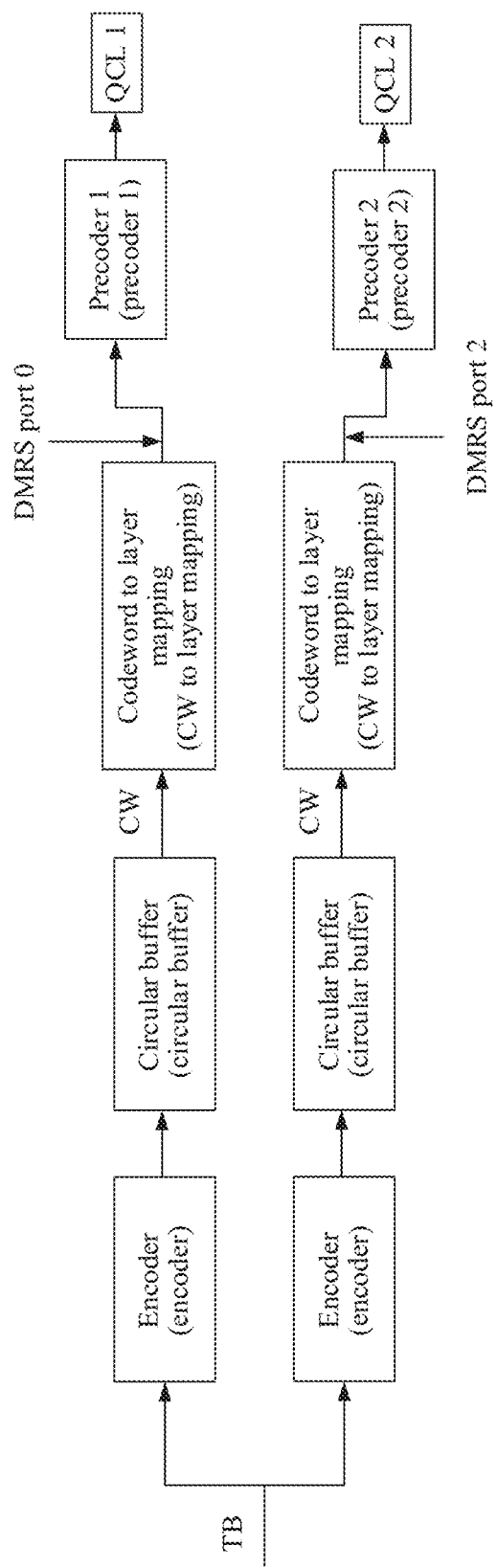
FIG. 4a is a schematic diagram of a transmission solution according to this application.

Solution 1(a): As shown in FIG. 4a, one resource block (transmission block, TB) is mapped to a transport layer through coding, and the transport layer corresponds to one DMRS port (this may be understood as conventional single-TRP transmission). In addition, a same TB is mapped to another transport layer in another coding scheme, and the transport layer corresponds to another DMRS port (this may be understood that two ports correspond to two times of repeat transmission).

Figure 4B:
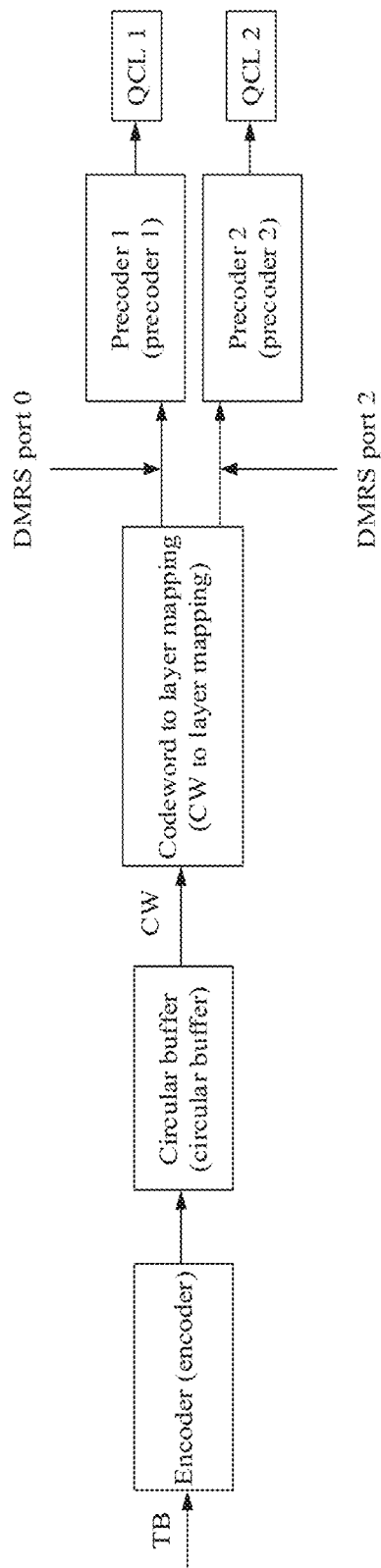
FIG. 4b is a schematic diagram of another transmission solution according to this application.

Solution 1(b): As shown in FIG. 4b, one TB is mapped to two transport layers through coding, the two transport layers each correspond to one DMRS port, and the DMRS ports correspond to different QCL information.

Figure 5A:
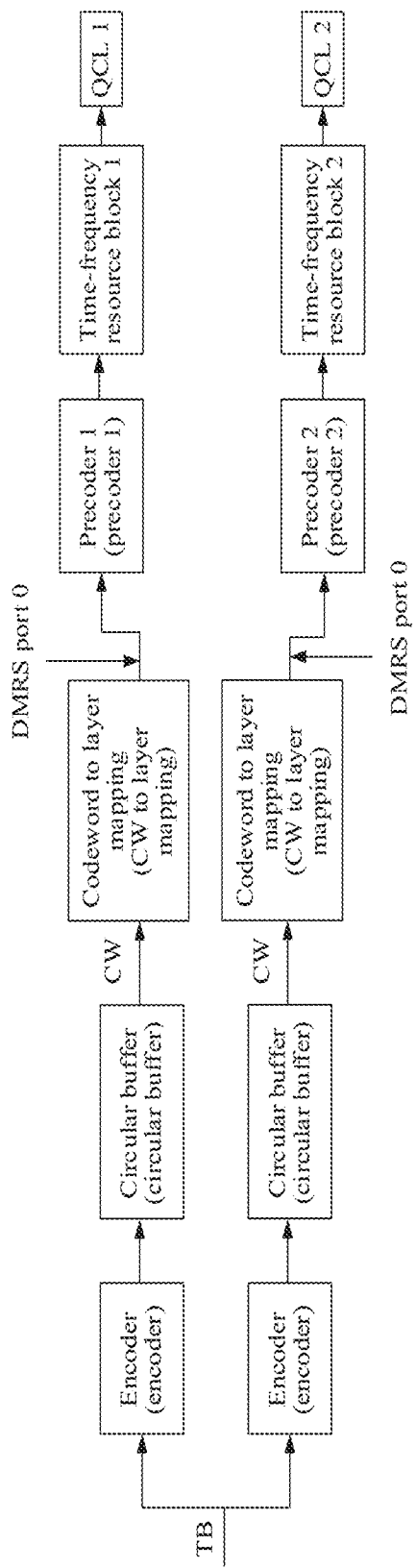
FIG. 5a is a schematic diagram of a transmission solution according to this application.

Solution 2: Transmit data by using a plurality of time-frequency units, the time-frequency units correspond to different QCL information, and each time-frequency unit may correspond to an orthogonal time-frequency resource. A specific solution is as follows:

Solution 2(a): As shown in FIG. 5a, all information bits of a same TB are mapped on different frequency domain resources or time domain resources for a plurality of times in different coding schemes (for example, by using different redundancy versions RVs), and the different frequency domain resources or time domain resources correspond to different QCL information. For example, if a base station indicates two pieces of QCL information and indicates four non-overlapping time units, the two pieces of QCL information alternately correspond to adjacent time units, and each time unit corresponds to all the information bits of the same TB.

Figure 5B:
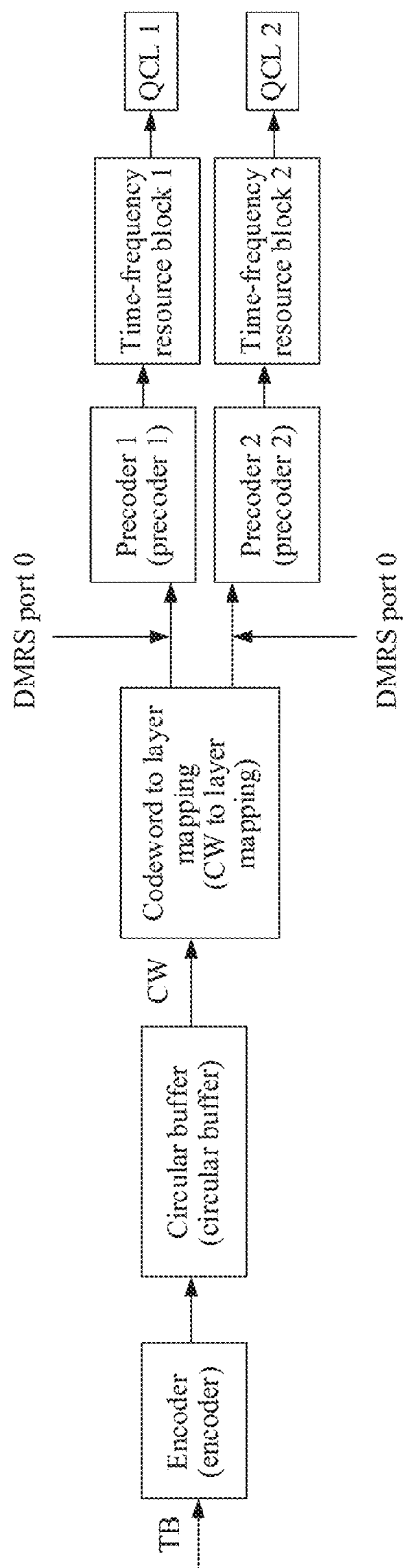
FIG. 5b is a schematic diagram of another transmission solution according to this application.

Solution 2(b): As shown in FIG. 5b, parts of information bits of a same TB are mapped on different frequency domain resources or time domain resources, and the different frequency domain resources or time domain resources correspond to different QCL information. For example, if a base station indicates two pieces of QCL information and indicates four non-overlapping time units, the two pieces of QCL information alternately correspond to adjacent time units, and all time units correspond to all information bits of one TB.

Figure 6:
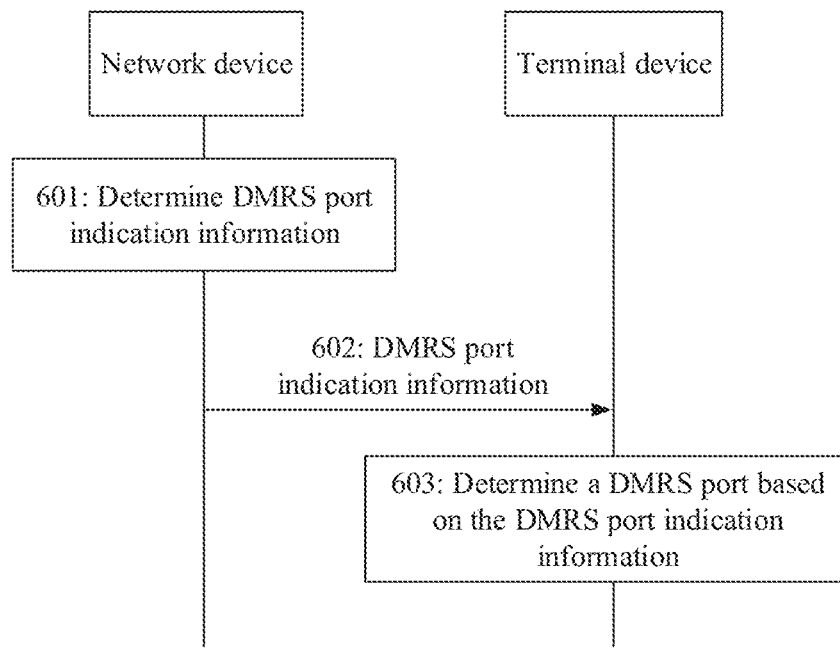
FIG. 6 is a flowchart of a DMRS port indication method according to this application.

Based on the foregoing descriptions and the communication system shown in FIG. 1, FIG. 6 shows a DMRS port indication method according to an embodiment of this application. A specific procedure of the method may include the following steps.

Step 601: A network device determines DMRS port indication information.

Specifically, the DMRS port indication information is used to indicate a DMRS port set, the DMRS port set is one of a plurality of DMRS port sets, DMRS ports included in at least one of the plurality of DMRS port sets belong to a plurality of CDM groups, and a quantity of codewords corresponding to each of the plurality of DMRS port sets is 1. A part or all of the plurality of DMRS port sets are first DMRS port sets, and each first DMRS port set includes at least a DMRS port with a largest port number in a first CDM group and a DMRS port with a largest port number in a second CDM group.

Figure 3:
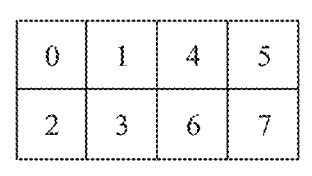

For example, the first CDM group may be the CDM group 1 shown in FIG. 3, and a number of the DMRS port with the largest port number in the first CDM group is 5. The second CDM group may be the CDM group 2 shown in FIG. 3, and a number of the DMRS port with the largest port number in the second CDM group is 7. In descriptions of this embodiment of this application, the first CDM group represents the CDM group 1, and the second CDM group represents the CDM group 2. Certainly, there may be other possibilities for the first CDM group and the second CDM group. However, details are not described in this embodiment of this application.

In an optional implementation, a DMRS port belonging to the first CDM group and a port of a first RS are QCL, a DMRS port belonging to the second CDM group and a port of a second RS are QCL, and the first RS is different from the second RS.

In a possible implementation, the first DMRS port set may include at least three of the following:

A quantity of DMRS ports belonging to the first CDM group in the first DMRS port set is equal to 1, and a quantity of DMRS ports belonging to the second CDM group in the first DMRS port set is equal to 1. In this case, the first DMRS port set may be {5, 7}.

A quantity of DMRS ports belonging to the first CDM group in the first DMRS port set is equal to 2, where the two DMRS ports belonging to the first CDM group are two DMRS ports with largest port numbers in the first CDM group; and a quantity of DMRS ports belonging to the second CDM group in the first DMRS port set is equal to 1. In this case, the first DMRS port set may be {4, 5, 7}.

A quantity of DMRS ports belonging to the first CDM group in the first port set is equal to 2, where the two DMRS ports belonging to the first CDM group are two DMRS ports with largest port numbers in the first CDM group; and a quantity of DMRS ports belonging to the second CDM group in the first DMRS port set is equal to 2, where the two DMRS ports belonging to the second CDM group are two DMRS ports with largest port numbers in the second CDM group. In this case, the first DMRS port set may be {4, 5, 6, 7}.

A quantity of DMRS ports belonging to the second CDM group in the first DMRS port set is equal to 2, where the two DMRS ports belonging to the second CDM group are two DMRS ports with largest port numbers in the second CDM group; and a quantity of DMRS ports belonging to the first CDM group in the first DMRS port set is equal to 1. In this case, the first DMRS port set may be {5, 6, 7}.

In a possible implementation, in addition to the foregoing possible cases, the first DMRS port set may further include at least one of the following:

A quantity of DMRS ports belonging to the first CDM group in the first DMRS port set is equal to 3, where the three DMRS ports belonging to the first CDM group are three DMRS ports with largest port numbers in the first CDM group; and a quantity of DMRS ports belonging to the second CDM group in the first DMRS port set is equal to 1. In this case, the first DMRS port set may be {1, 4, 5, 7}.

A quantity of DMRS ports belonging to the second CDM group in the first DMRS port set is equal to 3, where the three DMRS ports belonging to the second CDM group are three DMRS ports with largest port numbers in the second CDM group; and a quantity of DMRS ports belonging to the first CDM group in the first DMRS port set is equal to 1. In this case, the first DMRS port set may be {5, 3, 6, 7}.

In an example implementation, when only a part of the plurality of DMRS port number sets are the first DMRS port number sets, in addition to the first DMRS port number set, the plurality of DMRS port number sets may further include one or more of the following DMRS port sets: {0, 1, 2, 3}, {0, 1, 4, 2}, {1, 4, 3}, {0, 1, 2}, {5, 7}, {4, 6}, {0, 2}, and {1, 3}.

In a possible implementation, the plurality of DMRS port sets may exist in a form of a table. Based on the foregoing descriptions, the plurality of DMRS port sets may be shown in the following Table 5. It should be understood that the plurality of DMRS port sets shown in Table 5 are merely a specific representation form, and the plurality of DMRS port sets may alternatively have another existence form. This is not listed one by one herein in this application. For example, actual content corresponding to each index value may change, but should include a DMRS port combination type in the table.

TABLE 5

One codeword (One Codeword)

| Index | Quantity of CDM groups without data | DMRS port | Quantity of symbols occupied by a front-loaded DMRS |
|---|---|---|---|
| 0 | 2 | 0-3 | 2 |
| 1 | 2 | 0, 1, 4, 2 | 2 |
| 2 | 2 | 4-7 | 2 |
| 3 | 2 | 5, 3, 6, 7 | 2 |
| 4 | 2 | 1, 4, 5, 7 | 2 |
| 5 | 2 | 5, 6, 7 | 2 |
| 6 | 2 | 4, 5, 7 | 2 |
| 7 | 2 | 1, 4, 3 | 2 |
| 8 | 2 | 5, 7 | 2 |
| 9 | 2 | 4, 6 | 2 |

TABLE 5-continued

One codeword (One Codeword)

| Index | Quantity of CDM groups without data | DMRS port | Quantity of symbols occupied by a front-loaded DMRS |
|---|---|---|---|
| 10 | 2 | 0, 2 | 2 |
| 11 | 2 | 1, 3 | 2 |

A quantity, of OFDM symbols occupied by a front-loaded DMRS, corresponding to any port set shown in Table 5 is 2, where a length of the symbols occupied by the front-loaded DMRS is used to indicate a length of symbols occupied by a DMRS located before first data, and the DMRS is a DMRS of the first data.

A quantity, of CDM groups without data, corresponding to any port set shown in Table 5 is 2, where the quantity of CDM groups without data is used to indicate a quantity of CDM groups that are not used to carry data and that are on an OFDM symbol occupied by a DMRS.

Specifically, the first DMRS port set may include DMRS port sets whose indexes are 2, 3, 4, 5, 6, and 8 in Table 5.

In an optional implementation, the plurality of DMRS port sets may alternatively include only DMRS port sets whose indexes are 0, 2, 5, 6, 7, and 8 in Table 5.

An advantage of the design of the foregoing DMRS port sets lies in that a quantity of DMRS port sets is as small as possible, to support flexible port allocation, thereby meeting a requirement of performing MU-MIMO between different users.

In an optional implementation, the plurality of port sets may alternatively include only DMRS port sets whose indexes are 0, 1, 4, 6, 7, 8, and 9 in Table 5.

In this way, a rank indication of paired UE may be reduced in consideration of a limitation on a quantity of paired layers of NC-JT UE. For example, a maximum rank of the paired UE is limited to 2.

Certainly, the plurality of DMRS port sets may include only a part of the DMRS port sets in Table 5, or there may be other cases. This is not listed herein one by one.

It should be noted that a sequence of indexes in Table 5 is merely an example. In practice, a sequence of DMRS port number sets is not limited to the sequence in Table 5. This is not limited in this application. In addition, a sequence of DMRS ports in each DMRS port set is merely an example. The DMRS ports in the DMRS port set may be arranged in a random sequence. This is not limited in this application.

In a specific implementation, to support dynamic switching between a case in which a quantity of OFDM symbols occupied by the front-loaded DMRS is 1 and a case in which a quantity of OFDM symbols occupied by the front-loaded DMRS is 2, three entries (entries) in the following Table 6 may be further added to Table 5.

TABLE 6

One codeword (One Codeword)

| Index | Quantity of CDM groups without data | DMRS port | Quantity of symbols occupied by a front-loaded DMRS |
|---|---|---|---|
| 1 | 2 | 0, 2 | 1 |
| 2 | 2 | 0-2 | 1 |
| 3 | 2 | 0-3 | 1 |

The foregoing three entries may be added at the front of Table 5, or certainly may be added at another location in Table 5. This is not limited in this application.

A quantity, of OFDM symbols occupied by a front-loaded DMRS, corresponding to any DMRS port set in Table 6 is 1, and a quantity, of CDM groups without data, corresponding to any DMRS port set is 2.

Specifically, when an entry in Table 6 is indicated, a terminal device assumes that transmission in this case is SU-MIMO, that is, a DMRS port and a data port that are on a time-frequency resource allocated to the UE and that are not allocated to the UE are not allocated to another user. When another entry is indicated, a terminal device assumes that transmission in this case is MU-MIMO, that is, a DMRS port and a data port that are on a time-frequency resource allocated to the UE and that are not allocated to the UE are allocated to another user.

In another specific implementation, to support dynamic switching between single-TRP transmission and NC-JT transmission, an entry indicating one CDM group in a part of Table 7 is added to the foregoing Table 5 or a table obtained by combining Table 5 and Table 6.

TABLE 7

One codeword (One Codeword)

| Index | Quantity of CDM groups without data | DMRS port | Quantity of symbols occupied by a front-loaded DMRS |
|---|---|---|---|
| 1 | 1 | 0 | 1 |
| 2 | 1 | 0, 1 | 1 |
| 3 | 2 | 3 | 1 |
| 4 | 2 | 0, 1 | 1 |
| 5 | 2 | 5 or 7 | 2 |
| 6 | 2 | 0, 1 | 2 |
| 7 | 2 | 0, 1, 4 | 2 |
| 8 | 2 | 0, 1, 4, 5 | 2 |

In Table 7, a quantity, of OFDM symbols occupied by a front-loaded DMRS, corresponding to some DMRS port sets is 1, and a corresponding quantity of CDM groups without data is 1; a quantity, of OFDM symbols occupied by a front-loaded DMRS, corresponding to some DMRS port sets is 1, and a corresponding quantity of CDM groups without data is 2; a quantity, of OFDM symbols occupied by a front-loaded DMRS, corresponding to some other DMRS port sets is 2, and a corresponding quantity of CDM groups without data is 2.

In an optional implementation, in Table 7, when port sets indicated by the DMRS port indication information are port sets corresponding to indexes 1 and 2, transmission on a corresponding PDSCH is SU-MIMO; when port sets indicated by the DMRS port indication information are port sets corresponding to other indexes, transmission on a corresponding PDSCH is MU-MIMO.

In an optional implementation, when the DMRS port set indicated by the DMRS port indication information is the first DMRS port set, transmission on a corresponding PDSCH is multi-user multiple-input multiple-output (MU-MIMO) transmission.

In an optional implementation, the DMRS port set further includes a second DMRS port set, and each port set in the second DMRS port set includes only a DMRS port in one CDM group. In this case, when the port set indicated by the DMRS port indication information is the second DMRS port set, transmission on a corresponding PDSCH is SU-MIMO. For example, Table 5 further includes the second DMRS port set.

In another optional implementation, when the DMRS port set indicated by the DMRS port indication information is the first DMRS port set and a quantity of corresponding front-loaded DMRS symbols is 1, transmission on a corresponding PDSCH is single-user multiple-input multiple-output (SU-MIMO) transmission; or when the DMRS port set indicated by the DMRS port indication information is the first DMRS port set and a quantity of corresponding front-loaded DMRS symbols is 2, transmission on a corresponding PDSCH is multi-user multiple-input multiple-output (MU-MIMO) transmission.

In an example implementation, a transport layer corresponding to each DMRS port in the first DMRS port set is used to carry all bits of a same TB.

In an example implementation, a transport layer corresponding to each DMRS port in the first DMRS port set is used to carry all bits of a same TB.

In an optional implementation, when a quantity of QCL assumptions indicated by the network device is 1, a DMRS port set corresponding to an index value indicated by the DMRS port indication information is a DMRS port set corresponding to the index value in Tables 1 to 4. When a quantity of QCL assumptions indicated by the network device is 2, a DMRS port set corresponding to an index value indicated by the DMRS port indication information is a DMRS port set corresponding to the index value in Tables 5 to 7.

In an optional implementation, when a quantity of QCL assumptions indicated by the network device is 2, DMRS port sets corresponding to index values indicated by the DMRS port indication information are DMRS port sets corresponding to index values 1 and 2 in Table 6 or Table 7. In this case, a corresponding DMRS port and corresponding data transmission are SU-MIMO, that is, the DMRS port and the data port that are on the time-frequency resource allocated to the UE and that are not allocated to the UE are not allocated to another user. When a quantity of QCL assumptions indicated by the network device is 1, DMRS port sets corresponding to index values indicated by the DMRS port indication information are DMRS port sets corresponding to index values 1 and 2 in Table 7. In this case, a corresponding DMRS port and corresponding data transmission are MU-MIMO, that is, the DMRS port and the data port that are on the time-frequency resource allocated to the UE and that are not allocated to the UE are allocated to another user.

For example, the network device stores a table including the plurality of DMRS port sets, and the network device may determine the DMRS port indication information in the stored table.

Step 602: The network device sends the DMRS port indication information to the terminal device.

Step 603: The terminal device determines a DMRS port based on the DMRS port indication information.

In an optional implementation, the indication information is a table including a plurality of DMRS port sets, the indication information indicates one entry in the table, the terminal device stores the table, and the terminal device searches the table based on the indication information to determine the DMRS port.

During specific implementation, after performing step 602, the network device sends a DMRS and related data based on the DMRS port indicated by the DMRS port indication information, and correspondingly, after step 603, the terminal device receives the DMRS and the related data based on the determined DMRS port.

According to the DMRS port indication method provided in this embodiment of this application, the DMRS port indicated by the network device to the terminal device can meet NC-JT transmission.

Figure 7:
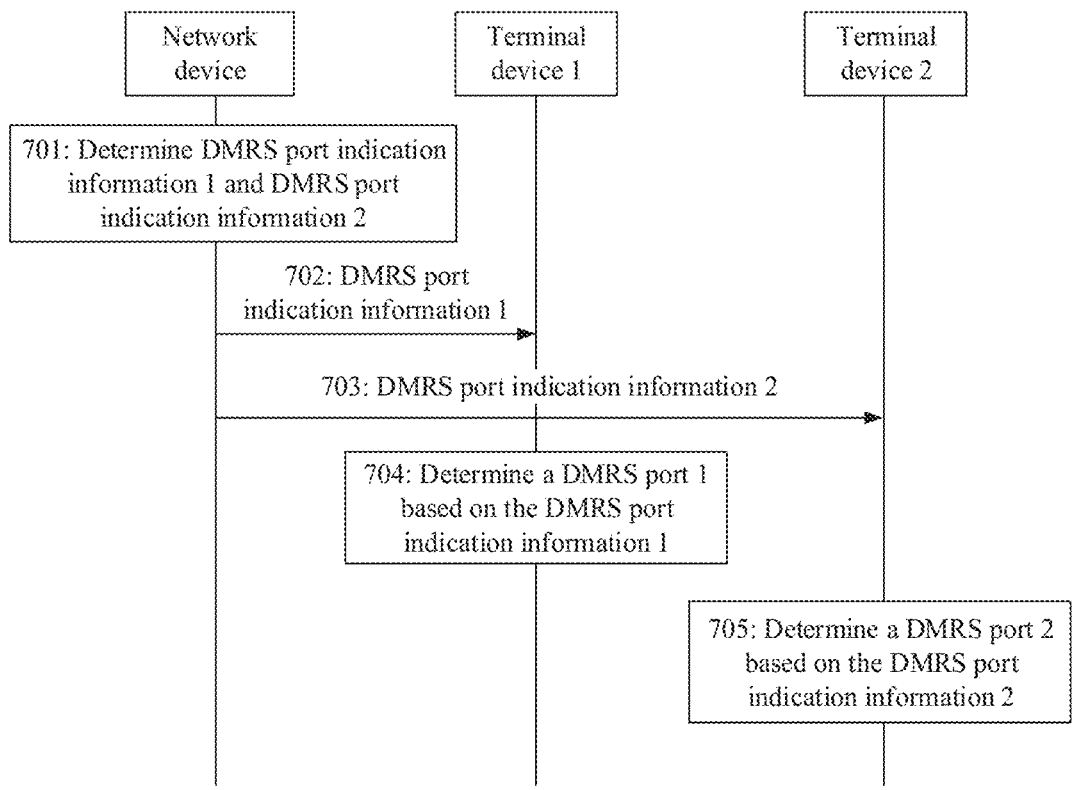
FIG. 7 is a flowchart of an example of a DMRS port indication method according to this application.

Based on the foregoing embodiments, an embodiment of this application provides an example of a DMRS port indication method. As shown in FIG. 7, a specific procedure of the example may include the following steps.

Step 701: A network device determines DMRS port indication information 1 and DMRS port indication information 2.

The DMRS port indication information 1 is used to indicate a DMRS port set 1, and the DMRS port indication information 2 is used to indicate a DMRS port set 2. The DMRS port set 1 is one of a plurality of DMRS port sets, and the DMRS port set 1 is another one of the plurality of DMRS port sets.

Specifically, for specific descriptions of the plurality of DMRS port sets, refer to descriptions of the plurality of DMRS port sets in step 601. Details are not described herein again.

Step 702: The network device sends the DMRS port indication information 1 to a terminal device 1.

Step 703: The network device sends the DMRS port indication information 2 to a terminal device 2.

It should be noted that a sequence of step 702 and step 703 may be reversed, or step 702 and step 703 may be performed simultaneously. This is not limited in this application.

Step 704: The terminal device 1 determines a DMRS port 1 based on the DMRS port indication information 1.

Step 705: The terminal device 2 determines a DMRS port 2 based on the DMRS port indication information 2.

Similarly, a sequence of step 704 and step 705 may also be reversed, or step 704 may be performed after step 702, then step 703 is performed, and then step 705 is performed.

For example, the DMRS port set 1 and the DMRS port set 2 are determined by the network device to enable the terminal device 1 and the terminal device 2 to implement NC-JT transmission. In this way, the terminal device 1 may subsequently determine the DMRS port 1 based on the DMRS port indication information 1, so that the terminal device 2 determines the DMRS port 2 based on the DMRS port indication information 1, thereby implementing NC-JT transmission.

During specific implementation, after delivering the DMRS port indication information 1, the network device sends a DMRS and related data based on the DMRS port indicated by the DMRS port indication information 1, and correspondingly, after determining the DMRS port 1, the terminal device 1 receives the DMRS and the related data based on the determined DMRS port 1. Similarly, after delivering the DMRS port indication information 2, the network device sends a DMRS and related data based on the DMRS port indicated by the DMRS port indication information 2, and correspondingly, after determining the DMRS port 2, the terminal device 2 receives the DMRS and the related data based on the determined DMRS port 2.

Figure 8:
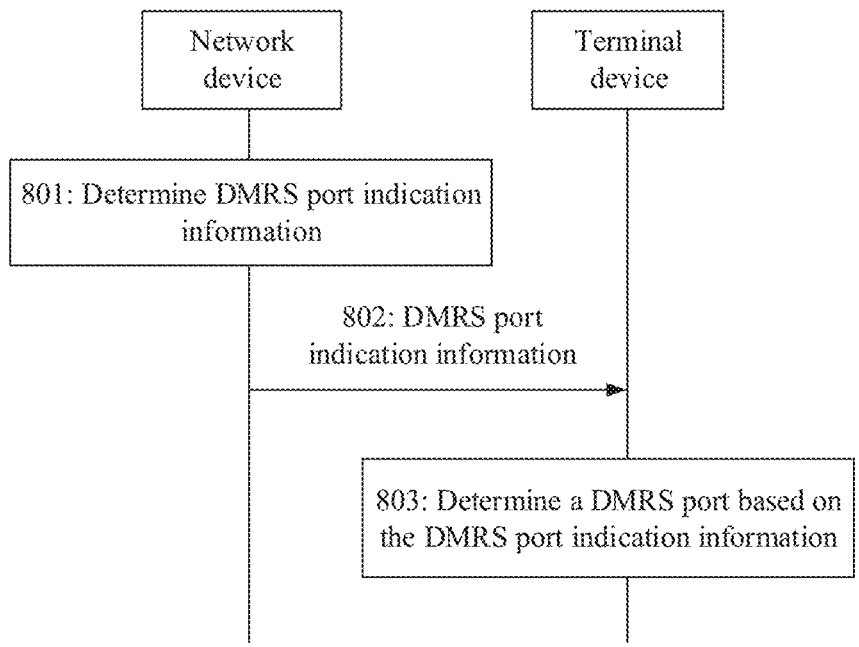
FIG. 8 is a flowchart of another DMRS port indication method according to this application.

An embodiment of this application further provides another DMRS port indication method, which is applicable to the communication system shown in FIG. 1. Refer to FIG. 8, a specific procedure of the method may include the following steps.

Step 801: A network device determines DMRS port indication information.

Specifically, the DMRS port indication information is used to indicate a DMRS port set, and the DMRS port set is one of a plurality of DMRS port sets; a part of the plurality of DMRS port sets are second DMRS port sets, and DMRS ports included in each second DMRS port set belong to a plurality of CDM groups; and a part of the plurality of DMRS port sets are third DMRS port sets, and at least one DMRS port included in each third DMRS port set belongs to a same CDM group.

The second DMRS port set is used to indicate that QCL information used to transmit corresponding PDSCHs in different time units or frequency domain units is the same, and the third DMRS port set is used to indicate that QCL information used to transmit corresponding PDSCHs in different time units or frequency domain units is different.

Optionally, the network device determines QCL indication information, where the QCL indication information is used to indicate to receive the DMRS port and QCL information of a PDSCH corresponding to the DMRS port. The QCL indication information includes at least two pieces of QCL information, where the two pieces of QCL information are used to indicate to receive the DMRS port, and the PDSCH corresponding to the DMRS port uses the at least two pieces of QCL information.

Optionally, a part of ports in the DMRS port set are received by using one of the at least two pieces of QCL information, and the other part of ports in the DMRS port set are received by using the other of the at least two pieces of QCL information.

Optionally, all DMRS ports in the DMRS port set are received by using the at least two pieces of QCL information, and a same DMRS port is received by using different QCL information in different time units or frequency domain units.

In an optional implementation, when the DMRS port set indicated by the DMRS port indication information is the first DMRS port set, the at least two pieces of QCL information are used to receive a DMRS and corresponding data in each of the different time units or frequency domain units; when the DMRS port set indicated by the DMRS port indication information is the second DMRS port set, one of the at least two pieces of QCL information is used to receive a DMRS and corresponding data in each of the different time units or frequency domain units.

In another optional implementation, when the DMRS port set indicated by the DMRS port indication information is the second DMRS port set, different QCL information is used to receive the DMRS and the corresponding data in adjacent time units or frequency domain units.

For example, each of the different time units includes at least one OFDM symbol and is located in a same slot, and all the different time units include a same quantity of OFDM symbols. The different time units are sequentially arranged in time domain. A time interval between adjacent time units is N OFDM symbols, where N is a natural number.

In another example, the different time units are located in different slots, and the different time units include a same quantity of OFDM symbols in different slots.

In a possible implementation, when the DMRS port set indicated by the DMRS port indication information is the first DMRS port set, a DMRS port belonging to a first CDM group and a DMRS port belonging to a second CDM group in each time unit correspond to different QCL information. In a possible design, the different frequency domain units are located in a same system bandwidth BWP, or are located in a same carrier CC.

Optionally, configuration signaling is used to indicate a quantity of time units.

Optionally, each of the different frequency domain units includes at least one RB.

Specifically, the different frequency domain units are separated by M RBs in frequency domain, where M is an integer greater than or equal to 0.

For example, the DMRS and the corresponding data are sent in each frequency domain unit in a same beamforming manner.

In another possible implementation, when the DMRS port set indicated by the DMRS port indication information is the second DMRS port set, one piece of QCL information is used to receive a DMRS and corresponding data in each frequency domain unit.

Specifically, different QCL information is used to receive the DMRS and the corresponding data in adjacent frequency domain units in frequency domain.

In a possible implementation, when the DMRS port set indicated by the DMRS port indication information is the first DMRS port set, a DMRS port belonging to a first CDM group and a DMRS port belonging to a second CDM group in each frequency domain unit correspond to different QCL information.

In an example, the network device determines that the QCL indication information indicates two pieces of QCL information, and determines that a quantity of time units is 4. When at least one DMRS port indicated by the DMRS port indication information belongs to a same CDM group, each time unit corresponds to only one of two pieces of QCL information. For example, time units 1 and 3 correspond to QCL information 1 and time units 2 and 4 correspond to QCL information 2, or time units 1 and 2 correspond to QCL information 1 and time units 3 and 4 correspond to QCL information 2. When DMRS ports indicated by the DMRS port indication information belong to two CDM groups, each time unit corresponds to two pieces of QCL information. For example, in each time unit, a DMRS port in a CDM group 1 corresponds to QCL information 1, and a DMRS port of a CDM group 2 corresponds to QCL information 2.

In another example, the network device determines that the QCL indication information indicates two pieces of QCL information. When DMRS ports indicated by the DMRS port indication information belong to two CDM groups, all frequency domain units correspond to two pieces of QCL information. For example, in each frequency domain unit, a CDM group 1 corresponds to QCL information 1, and a CDM group 2 corresponds to QCL information 2. The frequency domain unit herein may be understood as a precoding resource group (precoding resource group, PRG). Beamforming manners of DMRSs and corresponding data in PRGs are the same. Alternatively, the frequency domain unit may be understood as a resource block group (resource block group, RBG), and a frequency domain resource allocation indication uses the RBG as a granularity. In this case, all scheduled RBs correspond to the same QCL information.

When at least one DMRS port indicated by the DMRS port indication information belongs to a same CDM group, different frequency domain units each correspond to one of two pieces of QCL information. For example, all scheduled RBs are divided into two frequency domain parts. A specific division manner may be: All scheduled RBs are divided into a plurality of frequency domain units, the first frequency domain part includes a part of the plurality of frequency domain units, and the second frequency domain part includes a frequency domain unit other than the part of frequency domain units. For example, two adjacent frequency domain units belong to different frequency domain parts. A DMRS port in the first frequency domain part corresponds to the QCL information 1, and a DMRS port in the second frequency domain part corresponds to the QCL information 2.

Step 802: The network device sends the DMRS port indication information to a terminal device.

Optionally, the network device further sends the QCL indication information.

Step 803: The terminal device determines a DMRS port based on the DMRS port indication information.

In an optional implementation, the terminal device further receives the QCL indication information.

Specifically, the terminal device further determines mapping relationships between different time units or frequency domain units and QCL information based on the DMRS port indication information.

In an optional implementation, the network device further determines a transmission mechanism, sends the DMRS port indication information based on the determined transmission mechanism, and then sends the DMRS and the related data based on the transmission mechanism and the DMRS port indicated by the DMRS port indication information. Correspondingly, the terminal device determines the transmission mechanism and the DMRS port based on the DMRS port indication information, and then receives the DMRS and the related data based on the transmission mechanism and the DMRS port.

In an optional implementation, the PDSCHs in the different time units or frequency domain units correspond to one redundancy version or codeword of a same TB. For example, in step 801, the network device further determines RV version indication information, where the RV version indication information is used to indicate a start value of an RV version. Then, in step 802, the network device sends the RV version indication information to the terminal device. In step 803, the terminal device determines, based on the RV version indication information, the RV version used for receiving the data.

Figure 9:
FIG. 9 is a schematic diagram of a correspondence between QCL information and a time domain resource according to this application.
Figure 9:
Figure 10:
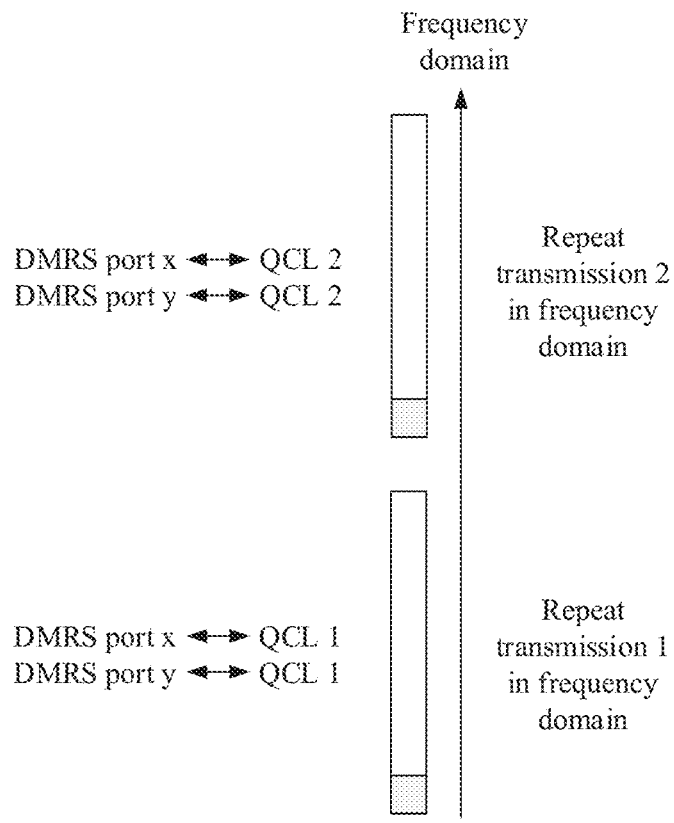
FIG. 10 is a schematic diagram of a correspondence between QCL information and a frequency domain resource according to this application.

For example, when only Solution 2 of the transmission solution in the point (3) in the foregoing concept and basic knowledge introduction is used, a correspondence between QCL information and a time domain resource is shown in FIG. 9, or a correspondence between QCL information and a frequency domain resource is shown in FIG. 10. In FIG. 9, transmission in a same time period (that is, in a same time unit) corresponds to only one piece of QCL information, and transmission in different time periods (time units) corresponds to different QCL information. In FIG. 10, transmission in a same frequency band (that is, in a same frequency domain unit) corresponds to only one piece of QCL information, and transmission in different frequency bands (frequency domain units) corresponds to different QCL information.

In another optional implementation, the PDSCHs in the different time units or frequency domain units correspond to different redundancy versions or codewords of a same TB. For example, in step 801, the network device further determines RV version indication information, where the RV version indication information is used to indicate start values of two RVs. Then, in step 802, the network device sends the RV version indication information to the terminal device. In step 803, the terminal device determines, based on the RV version indication information, the RV version used for receiving the data.

Figure 11:
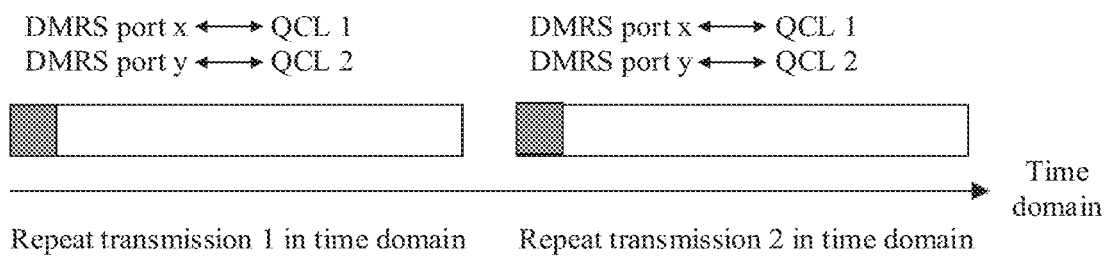
FIG. 11 is a schematic diagram of another correspondence between QCL information and a time domain resource according to this application.
Figure 12:
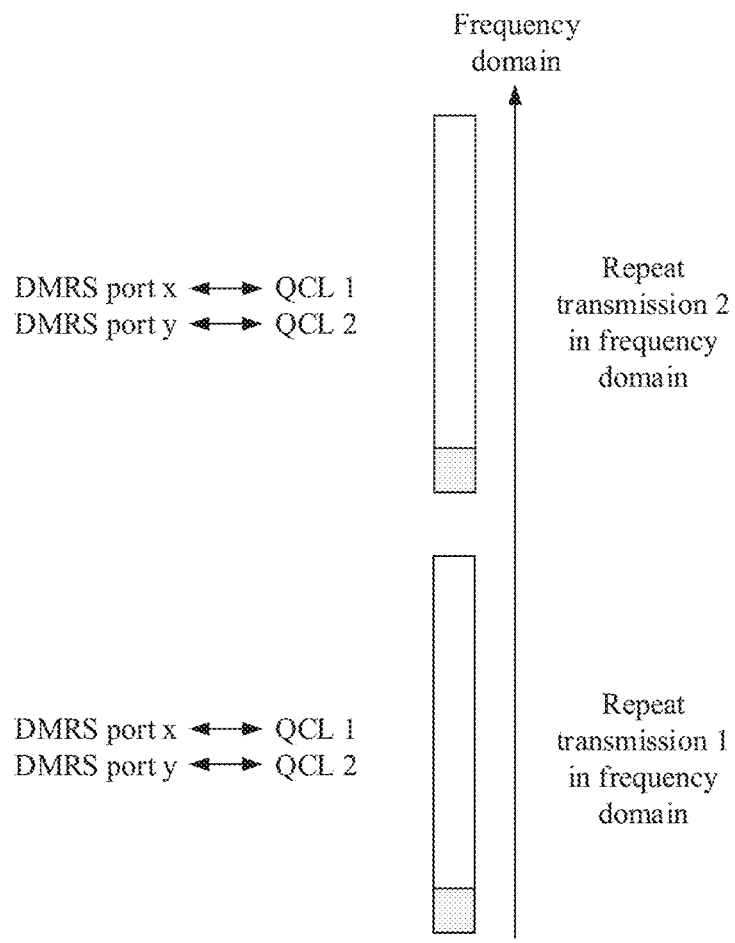
FIG. 12 is a schematic diagram of another correspondence between QCL information and a frequency domain resource according to this application.

For example, when a solution obtained by combining Solution 1 and Solution 2 of the transmission solution in the point (3) in the foregoing concept and basic knowledge introduction is used, a correspondence between QCL information and a time domain resource is shown in FIG. 11, or a correspondence between QCL information and a frequency domain resource is shown in FIG. 12. In FIG. 11, transmission in each time period (time unit) corresponds to different QCL information, and repetitions in different time periods (time units) correspond to the same QCL information (for example, both are 2). In FIG. 12, transmission in each frequency band (frequency domain unit) corresponds to different QCL information, and repetitions in different frequency bands (frequency domain units) correspond to the same QCL information (for example, both are 2). Time domain units or frequency domain units corresponding to the same QCL information correspond to a same RV version, and time domain units or frequency domain units corresponding to different QCL information correspond to different RV versions. In other words, different time domain units or frequency domain units respectively correspond to start values of different RV versions.

In another optional implementation, in step 801, the network device further determines codeword indication information. Then, in step 802, the network device sends the codeword indication information to the terminal device. In step 803, the terminal device determines, based on the codeword indication information, an MCS and a data transmission mechanism that are used to receive data.

For example, the network device sends DCI, where the DCI is used to schedule transmission of one TB, including a time-frequency resource occupied for transmission of the TB, a transmission manner, and the like. The DCI includes two pieces of codeword indication information, and each piece of codeword indication information is used to indicate an MCS of a scheduled TB, an RV version, and new data transmission indication information (new data indicator, NDI). When the two pieces of codeword indication information indicate that only one codeword is activated, it indicates that PDSCHs in the different time units or frequency domain units correspond to one redundancy version or codeword of a same TB, that is, data in different time units or frequency domain units is continuously coded starting from a start location corresponding to one RV version. Specifically, if the DCI indicates that only the first codeword is activated, the first MCS indication field and the first RV indication field are used to indicate that one codeword is activated and indicate an MCS and an RV version of the codeword. The second MCS indication field and the second RV indication field are used to indicate to deactivate the second codeword, for example, indicate that an MCS index value 26 and an RV index value 1 indicate that the second codeword is deactivated. Data in different time units or frequency domain units receives the TB in a coding manner indicated by the first MCS indication field and the first RV indication field.

When the two pieces of codeword indication information indicate that two codewords are activated, it indicates that PDSCHs in the different time units or frequency domain units correspond to different redundancy versions or codewords of a same TB, that is, data in different time units or frequency domain units is continuously coded starting from start locations corresponding to different RV versions. Specifically, when the DCI indicates that two codewords are activated, the first MCS indication field and the first RV indication field are used to indicate an MCS and an RV of the TB, and the second MCS indication field and the second RV indication field are used to indicate another MCS and another RV of the TB, where the first MCS indication field corresponds to a part of frequency domain units (denoted as first frequency domain units), and the second MCS indication field corresponds to a frequency domain unit (denoted as a second frequency domain unit) other than the part of frequency domain units. The first frequency domain unit corresponds to a modulation and coding scheme corresponding to the first MCS indication field and the first RV indication field, and the second frequency domain unit corresponds to a modulation and coding scheme corresponding to the second MCS indication field and the second RV indication field. In this case, a maximum quantity of front-loaded DMRS symbols is set to 1.

In a possible design, when the DMRS port set indicated by the DMRS port indication information is the first DMRS port set or the second DMRS port set, transmission on a corresponding PDSCH is single-user multiple-input multiple-output (SU-MIMO) transmission. The first DMRS port set includes a DMRS port set {0, 2}, and the second DMRS port set includes a DMRS port set {0}, or further includes a DMRS port set {0, 1}.

In a possible design, when the DMRS port set indicated by the DMRS port indication information is the first DMRS port set, transmission on a corresponding PDSCH is multi-user multiple-input multiple-output (MU-MIMO) transmission. The second DMRS port set includes DMRS port sets {0} and {1}, or further includes a DMRS port set {0, 1}.

In a specific implementation, the plurality of DMRS port sets may exist in a form of a table, and the plurality of DMRS port sets may include at least {0, 2} and {0}. The table may further include a field indicating a quantity of times of repetition in time domain (or frequency domain), for example, indicating two times, and may further include a field indicating QCL information, for example, indicating two pieces of QCL information. For example, when the DMRS port indication information indicates {0}, the transmission mode shown in FIG. 9 or FIG. 10 may be used. In the figure, x=y=0. When the DMRS port indication information indicates {0, 2}, the transmission mode shown in FIG. 11 or FIG. 12 may be used. In the figure, x=0, and y=2. Optionally, the table may reuse a table (4 to 6 bits (bits)) in a conventional technology, or may be a newly added table in this application.

In an optional implementation, a table including the plurality of DMRS port sets may be a 1-bit indication, for example, may be shown in Table 8.

TABLE 8

| | One codeword (One Codeword) | | |
|---|---|---|---|
| Index | Quantity of CDM groups without data | DMRS port | Quantity of symbols occupied by a front-loaded DMRS |
| 0 | 1 | 0 | 1 |
| 1 | 2 | 0, 2 | 1 |

In another optional implementation, a table including the plurality of DMRS port sets may be a 2-bit indication, for example, may be shown in Table 9.

TABLE 9

| | One codeword (One Codeword) | | |
|---|---|---|---|
| Index | Quantity of CDM groups without data | DMRS port | Quantity of symbols occupied by a front-loaded DMRS |
| 0 | 1 | 0 | 1 |
| 1 | 2 | 0, 1 | 1 |
| 2 | 2 | 0, 2 | 1 |

It should be understood that when the DMRS port set indicated by the DMRS port indication information is {0, 1}, the data transmission mode is similar to the data transmission mode that exists when the DMRS port set indicated by the DMRS port indication information is {0}. For example, the transmission mode in FIG. 9 or FIG. 10 may also be used.

In a possible implementation, the plurality of DMRS port sets may further include sets such as {0-2} and {0-3}, that is, a table including the DMRS port set may further include sets such as {0-2} and {0-3}. In a manner, a transmission mechanism indicated by the DMRS port set is the same as a transmission mechanism indicated by {0, 2}, that is, the following rule proposed in this application is complied: When a plurality of CDM groups are indicated, the same QCL information is used to receive DMRSs and corresponding data in different time domain units or frequency domain units. For example, in a time unit or frequency domain unit, the DMRS port set {0-2} may predefine that DMRS ports 0 and 1 correspond to QCL 1, and a DMRS port 2 corresponds to QCL 2.

In another manner, a transmission mechanism indicated by the DMRS port set is the same as a transmission mechanism indicated by {0}, {1}, or {0, 1}. In other words, when the DMRS port set includes more than two DMRS ports, different QCL information is used to receive DMRSs and corresponding data in different time domain units or frequency domain units, and the same QCL information is used to receive DMRSs belonging to different CDM groups in a same time domain unit or frequency domain unit. For example, in FIG. 9 or FIG. 10, if there is still one DMRS port z (not shown in the figure), on the first time domain resource (or frequency domain resource), x=0, y=1, and z=2, and all three DMRS ports correspond to QCL 1; on the second time domain resource (or frequency domain resource), x=0, y=1, and z=2, and all three DMRS ports correspond to QCL 2.

According to the DMRS port indication method provided in this embodiment of this application, different high-reliability transmission mechanisms may be indicated without increasing indication overheads, so as to ensure that the terminal device can correctly receive data based on different transmission mechanisms, and support dynamic transmission mechanism switching to improve spectral efficiency.

Figure 13:
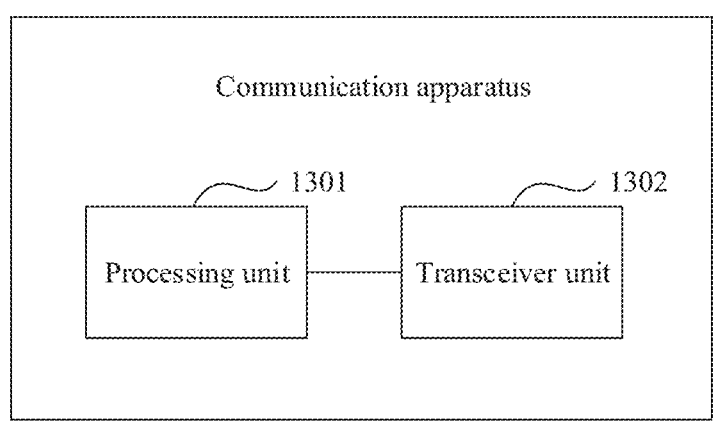
FIG. 13 is a schematic diagram of a structure of a communication apparatus according to this application.

Based on the foregoing embodiments, an embodiment of this application provides a communication apparatus. The communication apparatus is used in the communication system shown in FIG. 1. The communication apparatus may be configured to implement the DMRS port indication method shown in FIG. 6 to FIG. 8. Refer to in FIG. 13. The communication apparatus may include a processing unit 1301 and a transceiver unit 1302.

In an embodiment, the communication apparatus may be a network device, configured to implement functions of the network device in the embodiment shown in FIG. 6. The functions may be specifically:

The processing unit 1301 is configured to determine DMRS port indication information, where the DMRS port indication information is used to indicate a DMRS port set, the DMRS port set is one of a plurality of DMRS port sets, DMRS ports included in at least one of the plurality of DMRS port sets belong to a plurality of CDM groups, and a quantity of codewords corresponding to each of the plurality of DMRS port sets is 1; and a part or all of the plurality of DMRS port sets are first DMRS port sets, and each first DMRS port set includes at least a DMRS port with a largest port number in a first CDM group and a DMRS port with a largest port number in a second CDM group.

The transceiver unit 1302 is configured to send the DMRS port indication information.

In an optional implementation, a DMRS port belonging to the first CDM group and a port of a first RS are QCL, a DMRS port belonging to the second CDM group and a port of a second RS are QCL, and the first RS is different from the second RS.

For example, the first DMRS port set includes at least three of the following:
- a quantity of DMRS ports belonging to the first CDM group in the first DMRS port set is equal to 1, and a quantity of DMRS ports belonging to the second CDM group in the first DMRS port set is equal to 1;
- a quantity of DMRS ports belonging to the first CDM group in the first DMRS port set is equal to 2, where the two DMRS ports belonging to the first CDM group are two DMRS ports with largest port numbers in the first CDM group; and a quantity of DMRS ports belonging to the second CDM group in the first DMRS port set is equal to 1;
- a quantity of DMRS ports belonging to the first CDM group in the first port set is equal to 2, where the two DMRS ports belonging to the first CDM group are two DMRS ports with largest port numbers in the first CDM group; and a quantity of DMRS ports belonging to the second CDM group in the first DMRS port set is equal to 2, where the two DMRS ports belonging to the second CDM group are two DMRS ports with largest port numbers in the second CDM group; or
- a quantity of DMRS ports belonging to the second CDM group in the first DMRS port set is equal to 2, where the two DMRS ports belonging to the second CDM group are two DMRS ports with largest port numbers in the second CDM group; and a quantity of DMRS ports belonging to the first CDM group in the first DMRS port set is equal to 1.

Specifically, the first DMRS port set further includes at least one the following:
- the quantity of DMRS ports belonging to the first CDM group in the first DMRS port set is equal to 3, where the three DMRS ports belonging to the first CDM group are three DMRS ports with largest port numbers in the first CDM group; and the quantity of DMRS ports belonging to the second CDM group in the first DMRS port set is equal to 1; or
- the quantity of DMRS ports belonging to the second CDM group in the first DMRS port set is equal to 3, where the three DMRS ports belonging to the second CDM group are three DMRS ports with largest port numbers in the second CDM group; and the quantity of DMRS ports belonging to the first CDM group in the first DMRS port set is equal to 1.

In a possible implementation, when the DMRS port set indicated by the DMRS port indication information is the first DMRS port set, transmission on a corresponding PDSCH is multi-user multiple-input multiple-output (MU-MIMO) transmission.

In a possible implementation, when the DMRS port set indicated by the DMRS port indication information is the first DMRS port set and a quantity of corresponding front-loaded DMRS symbols is 1, transmission on a corresponding PDSCH is single-user multiple-input multiple-output (SU-MIMO) transmission; or when the DMRS port set indicated by the DMRS port indication information is the first DMRS port set and a quantity of corresponding front-loaded DMRS symbols is 2, transmission on a corresponding PDSCH is multi-user multiple-input multiple-output (MU-MIMO) transmission.

In another embodiment, the communication apparatus may be a terminal device, configured to implement functions of the terminal device in the embodiment shown in FIG. 6. The functions may be specifically:

The transceiver unit 1302 is configured to receive DMRS port indication information, where the DMRS port indication information is used to indicate a DMRS port set, the DMRS port set is one of a plurality of DMRS port sets, DMRS ports included in at least one of the plurality of DMRS port sets belong to a plurality of CDM groups, and a quantity of codewords corresponding to each of the plurality of DMRS port sets is 1; and
- a part or all of the plurality of DMRS port sets are first DMRS port sets, and each first DMRS port set includes at least a DMRS port with a largest port number in a first CDM group and a DMRS port with a largest port number in a second CDM group.

The processing unit 1301 is configured to determine a DMRS port based on the DMRS port indication information.

In an optional implementation, a DMRS port belonging to the first CDM group and a port of a first RS are QCL, a DMRS port belonging to the second CDM group and a port of a second RS are QCL, and the first RS is different from the second RS.

For example, the first DMRS port set includes at least three of the following:
- a quantity of DMRS ports belonging to the first CDM group in the first DMRS port set is equal to 1, and a quantity of DMRS ports belonging to the second CDM group in the first DMRS port set is equal to 1;
- a quantity of DMRS ports belonging to the first CDM group in the first DMRS port set is equal to 2, where the two DMRS ports belonging to the first CDM group are two DMRS ports with largest port numbers in the first CDM group; and a quantity of DMRS ports belonging to the second CDM group in the first DMRS port set is equal to 1;
- a quantity of DMRS ports belonging to the first CDM group in the first port set is equal to 2, where the two DMRS ports belonging to the first CDM group are two DMRS ports with largest port numbers in the first CDM group; and a quantity of DMRS ports belonging to the second CDM group in the first DMRS port set is equal to 2, where the two DMRS ports belonging to the second CDM group are two DMRS ports with largest port numbers in the second CDM group; or
- a quantity of DMRS ports belonging to the second CDM group in the first DMRS port set is equal to 2, where the two DMRS ports belonging to the second CDM group are two DMRS ports with largest port numbers in the second CDM group; and a quantity of DMRS ports belonging to the first CDM group in the first DMRS port set is equal to 1.

Specifically, the first DMRS port set further includes at least one the following:
- the quantity of DMRS ports belonging to the first CDM group in the first DMRS port set is equal to 3, where the three DMRS ports belonging to the first CDM group are three DMRS ports with largest port numbers in the first CDM group; and the quantity of DMRS ports belonging to the second CDM group in the first DMRS port set is equal to 1; or
- the quantity of DMRS ports belonging to the second CDM group in the first DMRS port set is equal to 3, where the three DMRS ports belonging to the second CDM group are three DMRS ports with largest port numbers in the second CDM group; and the quantity of DMRS ports belonging to the first CDM group in the first DMRS port set is equal to 1.

In a possible implementation, when the DMRS port set indicated by the DMRS port indication information is the first DMRS port set, transmission on a corresponding PDSCH is multi-user multiple-input multiple-output (MU-MIMO) transmission.

In a possible implementation, when the DMRS port set indicated by the DMRS port indication information is the first DMRS port set and a quantity of corresponding front-loaded DMRS symbols is 1, transmission on a corresponding PDSCH is single-user multiple-input multiple-output (SU-MIMO) transmission; or when the DMRS port set indicated by the DMRS port indication information is the first DMRS port set and a quantity of corresponding front-loaded DMRS symbols is 2, transmission on a corresponding PDSCH is multi-user multiple-input multiple-output (MU-MIMO) transmission.

In another embodiment, the communication apparatus may be a network device, configured to implement functions of the network device in the embodiment shown in FIG. 8. The functions may be specifically:

The processing unit 1301 is configured to determine DMRS port indication information, where the DMRS port indication information is used to indicate a DMRS port set, and the DMRS port set is one of a plurality of DMRS port sets; a part of the plurality of DMRS port sets are first DMRS port sets, and DMRS ports included in each first DMRS port set belong to a plurality of CDM groups; a part of the plurality of DMRS port sets are second DMRS port sets, and at least one DMRS port included in each second DMRS port set belongs to a same CDM group; and the first DMRS port set is used to indicate that QCL information used to transmit corresponding PDSCHs in different time units or frequency domain units is the same, and the second DMRS port set is used to indicate that QCL information used to transmit corresponding PDSCHs in different time units or frequency domain units is different.

The transceiver unit 1302 is configured to send the DMRS port indication information.

In an optional implementation, the PDSCHs in the different time units or frequency domain units correspond to one redundancy version or codeword of a same TB.

In another optional implementation, the PDSCHs in the different time units or frequency domain units correspond to different redundancy versions or codewords of a same TB.

For example, when the DMRS port set indicated by the DMRS port indication information is the first DMRS port set or the second DMRS port set, transmission on a corresponding PDSCH is single-user multiple-input multiple-output (SU-MIMO) transmission.

In another embodiment, the communication apparatus may be a terminal device, configured to implement functions of the terminal device in the embodiment shown in FIG. 8. The functions may be specifically:

The transceiver unit 1302 is configured to receive DMRS port indication information, where the DMRS port indication information is used to indicate a DMRS port set, and the DMRS port set is one of a plurality of DMRS port sets; a part of the plurality of DMRS port sets are first DMRS port sets, and DMRS ports included in each first DMRS port set belong to a plurality of CDM groups; a part of the plurality of DMRS port sets are second DMRS port sets, and at least one DMRS port included in each second DMRS port set belongs to a same CDM group; and the first DMRS port set is used to indicate that QCL information used to transmit corresponding PDSCHs in different time units or frequency domain units is different, and the second DMRS port set is used to indicate that QCL information used to transmit corresponding PDSCHs in different time units or frequency domain units is the same.

The processing unit 1301 is configured to determine a DMRS port based on the DMRS port indication information.

In an optional implementation, the PDSCHs in the different time units or frequency domain units correspond to one redundancy version of a same TB.

In another optional implementation, the PDSCHs in the different time units or frequency domain units correspond to different redundancy versions of a same TB.

For example, when the DMRS port set indicated by the DMRS port indication information is the first DMRS port set or the second DMRS port set, transmission on a corresponding PDSCH is single-user multiple-input multiple-output (SU-MIMO) transmission.

It should be noted that, in the embodiments of this application, division into the units is an example and merely logical function division, and may be other division in an actual implementation. Function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of this application. The storage medium includes any medium that can store program code such as a USB flash drive, a removable hard disk, a read-only memory (read-only memory, ROM), a random access memory (random access memory, RAM), a magnetic disk, or an optical disc.

Figure 14:
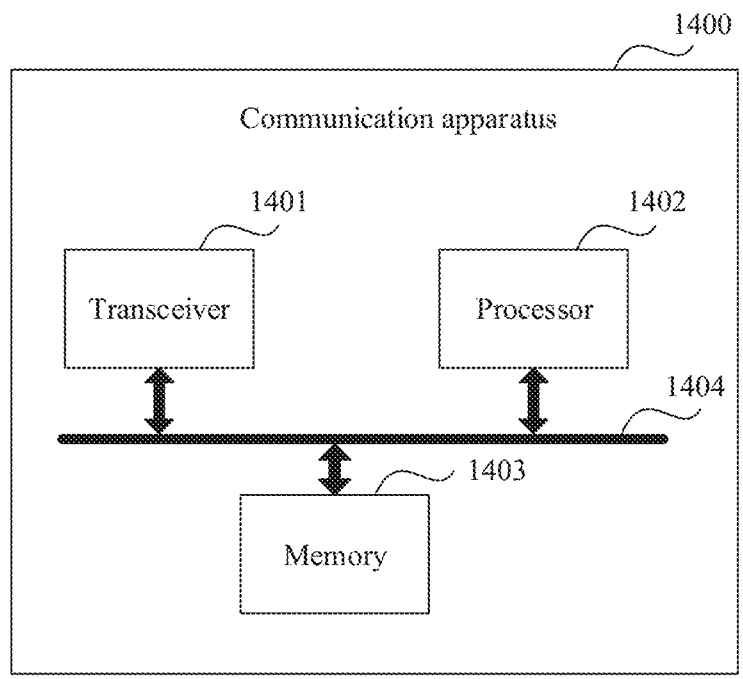
FIG. 14 is a diagram of a structure of a communication apparatus according to this application.

Based on the foregoing embodiments, an embodiment of this application further provides a communication apparatus. The communication apparatus is configured to implement the DMRS port indication method shown in FIG. 6 to FIG. 8. Refer to FIG. 14, the communication apparatus 1400 may include a transceiver 1401 and a processor 1402.

The processor 1402 may be a central processing unit (central processing unit, CPU), a network processor (network processor, NP), or a combination of the CPU and the NP. The processor 1402 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable logic gate array (field-programmable gate array, FPGA), generic array logic (generic array logic, GAL), or any combination thereof. The processor 1402 may implement the foregoing functions by hardware or by hardware executing corresponding software.

The transceiver 1401 and the processor 1402 are connected to each other. Optionally, the transceiver 1401 and the processor 1402 are connected to each other through a bus 1404. The bus 704 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 14, but this does not mean that there is only one bus or only one type of bus.

Optionally, the communication apparatus may further include a memory 1403, and the memory 1403 is configured to store a program and the like. Specifically, the program may include program code, and the program code includes computer operation instructions. The memory 1403 may include a RAM, and may further include a non-volatile memory (non-volatile memory), for example, at least one magnetic disk storage. The processor 1402 executes an application program stored in the memory 1403, to implement the foregoing functions, thereby implementing the DMRS port indication method shown in any one of FIG. 6 to FIG. 8.

In an embodiment, the communication apparatus may be a network device, configured to implement functions of the network device in FIG. 6 to FIG. 8. For details, refer to the foregoing method embodiments. Details are not described herein again.

In another embodiment, the communication apparatus may be a terminal device, configured to implement functions of the terminal device in FIG. 6 to FIG. 8. For details, refer to the foregoing method embodiments. Details are not described herein again.

An embodiment of this application further provides a computer-readable medium. The computer-readable medium stores a computer program. When the computer program is executed by a computer, the method in any one of the foregoing method embodiments is implemented.

An embodiment of this application further provides a computer program product. When the computer program product is executed by a computer, the method in any one of the foregoing method embodiments is implemented.

An embodiment of this application further provides a chip. The chip is coupled to a memory, to implement the method in any one of the foregoing method embodiments.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a special-purpose computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

The computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

The computer program instructions may be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A demodulation reference signal (DMRS) port indication method, comprising:
   determining DMRS port indication information, wherein:
      the DMRS port indication information is used to indicate a DMRS port set, and the DMRS port set is one of a plurality of DMRS port sets;
      a part of the plurality of DMRS port sets are first DMRS port sets, and DMRS ports comprised in each first DMRS port set belong to two code domain multiplexing (CDM) groups; and
      another part of the plurality of DMRS port sets are second DMRS port sets, and at least one DMRS port comprised in each second DMRS port set belongs to a same CDM group;
   determining quasi-co-location (QCL) indication information, wherein the QCL indication information indicates two pieces of QCL information, the two pieces of QCL information comprising a first piece of QCL information and a second piece of QCL information, wherein:
      when the DMRS port set indicated by the DMRS port indication information is a first DMRS port set, the two pieces of QCL information in each precoding resource group (PRG) indicate a reception of a DMRS and data of a corresponding PRG, a DMRS port belonging to a first CDM group is associated with the first piece of QCL information, a DMRS port belonging to a second CDM group is associated with the second piece of QCL information, and
      when the DMRS port set indicated by the DMRS port indication information is a second DMRS port set, one of the two pieces of QCL information is associated with reception of a DMRS and corresponding data in each PRG, wherein different pieces of QCL information are used to receive DMRSs and corresponding data in adjacent PRGs; and
   sending the DMRS port indication information and the QCL indication information.

2. The DMRS port indication method according to claim 1, wherein the first piece of QCL information is different from the second piece of QCL information.

3. The DMRS port indication method according to claim 1, wherein each first DMRS port set is used to indicate that QCL information used to transmit corresponding physical downlink shared channels (PDSCHs) in different time units or frequency domain units is the same, and the PDSCHs in the different time units or frequency domain units correspond to one redundancy version of a same resource block.

4. The DMRS port indication method according to claim 1, wherein each first DMRS port set is used to indicate that QCL information used to transmit corresponding physical downlink shared channels (PDSCHs) in different time units or frequency domain units is the same, and the PDSCHs in the different time units or frequency domain units correspond to different redundancy versions of a same resource block.

5. The DMRS port indication method according to claim 1, wherein when the DMRS port set indicated by the DMRS port indication information is the first DMRS port set or the second DMRS port set, transmission on a corresponding PDSCH is single-user multiple-input multiple-output (SU-MIMO) transmission.

6. A demodulation reference signal (DMRS) port indication method, comprising:
receiving DMRS port indication information, wherein:
the DMRS port indication information is used to indicate a DMRS port set, and the DMRS port set is one of a plurality of DMRS port sets;
a part of the plurality of DMRS port sets are first DMRS port sets, and DMRS ports comprised in each first DMRS port set belong to two code domain multiplexing (CDM) groups; and
another part of the plurality of DMRS port sets are second DMRS port sets, and at least one DMRS port comprised in each second DMRS port set belongs to a same CDM group;
receiving quasi-co-location (QCL) indication information, wherein the QCL indication information indicates two pieces of QCL information, the two pieces of QCL information comprising a first piece of QCL information and a second piece of QCL information, wherein:
when the DMRS port set indicated by the DMRS port indication information is a first DMRS port set, the two pieces of QCL information in each precoding resource group (PRG) indicate a reception of a DMRS and data of a corresponding PRG, a DMRS port belonging to a first CDM group is associated with the first piece of QCL information, a DMRS port belonging to a second CDM group is associated with the second piece of QCL information, and
when the DMRS port set indicated by the DMRS port indication information is a second DMRS port set, one of the two pieces of QCL information is associated with reception of a DMRS and corresponding data in each PRG, wherein different pieces of QCL information are used to receive DMRSs and corresponding data in adjacent PRGs; and
receiving the DMRS and corresponding data.

7. The DMRS port indication method according to claim 6, wherein the first piece of QCL information is different from the second piece of QCL information.

8. The DMRS port indication method according to claim 6, wherein each first DMRS port set is used to indicate that QCL information used to transmit corresponding physical downlink shared channels (PDSCHs) in different time units or frequency domain units is the same, and the PDSCHs in the different time units or frequency domain units correspond to one redundancy version of a same resource block.

9. The DMRS port indication method according to claim 6, wherein each first DMRS port set is used to indicate that QCL information used to transmit corresponding physical downlink shared channels (PDSCHs) in different time units or frequency domain units is the same, and the PDSCHs in the different time units or frequency domain units correspond to different redundancy versions of a same resource block.

10. The DMRS port indication method according to claim 6, wherein when the DMRS port set indicated by the DMRS port indication information is the first DMRS port set or the second DMRS port set, transmission on a corresponding PDSCH is single-user multiple-input multiple-output (SU-MIMO) transmission.

11. A communication apparatus, comprising:
at least one processor; and
one or more memories coupled to the at least one processor and storing programming instructions for execution by the at least one processor to:
determine DMRS port indication information, wherein:
the DMRS port indication information is used to indicate a DMRS port set, and the DMRS port set is one of a plurality of DMRS port sets;
a part of the plurality of DMRS port sets are first DMRS port sets, and DMRS ports comprised in each first DMRS port set belong to two code domain multiplexing (CDM) groups; and
another part of the plurality of DMRS port sets are second DMRS port sets, and at least one DMRS port comprised in each second DMRS port set belongs to a same CDM group;
determine quasi-co-location (QCL) indication information, wherein the QCL indication information indicates two pieces of QCL information, the two pieces of QCL information comprising a first piece of QCL information and a second piece of QCL information, wherein:
when the DMRS port set indicated by the DMRS port indication information is a first DMRS port set, the two pieces of QCL information in each precoding resource group (PRG) indicate a reception of a DMRS and data of a corresponding PRG, a DMRS port belonging to a first CDM group is associated with the first piece of QCL information, a DMRS port belonging to a second CDM group is associated with the second piece of QCL information, and
when the DMRS port set indicated by the DMRS port indication information is a second DMRS port set, one of the two pieces of QCL information is associated with reception of a DMRS and corresponding data in each PRG, wherein different pieces of QCL information are used to receive DMRSs and corresponding data in adjacent PRGs; and
send the DMRS port indication information and the QCL indication information.

12. The communication apparatus according to claim 11, wherein the first piece of QCL information is different from the second piece of QCL information.

13. The communication apparatus according to claim 11, wherein each first DMRS port set is used to indicate that QCL information used to transmit corresponding physical downlink shared channels (PDSCHs) in different time units or frequency domain units is the same, and the PDSCHs in the different time units or frequency domain units correspond to one redundancy version of a same resource block.

14. The communication apparatus according to claim 11, wherein each first DMRS port set is used to indicate that QCL information used to transmit corresponding physical downlink shared channels (PDSCHs) in different time units or frequency domain units is the same, and the PDSCHs in the different time units or frequency domain units correspond to different redundancy versions of a same resource block.

15. The communication apparatus according to claim 11, wherein when the DMRS port set indicated by the DMRS port indication information is the first DMRS port set or the second DMRS port set, transmission on a corresponding PDSCH is single-user multiple-input multiple-output (SU-MIMO) transmission.

16. A communication apparatus, comprising:
at least one processor; and
one or more memories coupled to the at least one processor and storing programming instructions for execution by the at least one processor to:
receive DMRS port indication information, wherein:
the DMRS port indication information is used to indicate a DMRS port set, and the DMRS port set is one of a plurality of DMRS port sets;
a part of the plurality of DMRS port sets are first DMRS port sets, and DMRS ports comprised in each first DMRS port set belong to two code domain multiplexing (CDM) groups; and
another part of the plurality of DMRS port sets are second DMRS port sets, and at least one DMRS port comprised in each second DMRS port set belongs to a same CDM group;
receive quasi-co-location (QCL) indication information, wherein the QCL indication information indicates two pieces of QCL information, the two pieces of QCL information comprising a first piece of QCL information and a second piece of QCL information, wherein:
when the DMRS port set indicated by the DMRS port indication information is a first DMRS port set, the two pieces of QCL information in each precoding resource group (PRG) indicate a reception of a DMRS and data of a corresponding PRG, a DMRS port belonging to a first CDM group is associated with the first piece of QCL information, a DMRS port belonging to a second CDM group is associated with the second piece of QCL information, and
when the DMRS port set indicated by the DMRS port indication information is a second DMRS port set, one of the two pieces of QCL information is associated with reception of a DMRS and corresponding data in each PRG, wherein different pieces of QCL information are used to receive DMRSs and corresponding data in adjacent PRGs; and
receive the DMRS and corresponding data.

17. The communication apparatus according to claim 16, wherein the first piece of QCL information is different from the second piece of QCL information.

18. The communication apparatus according to claim 16, wherein each first DMRS port set is used to indicate that QCL information used to transmit corresponding physical downlink shared channels (PDSCHs) in different time units or frequency domain units is the same, and the PDSCHs in the different time units or frequency domain units correspond to one redundancy version of a same resource block.

19. The communication apparatus according to claim 16, wherein each first DMRS port set is used to indicate that QCL information used to transmit corresponding physical downlink shared channels (PDSCHs) in different time units or frequency domain units is the same, and the PDSCHs in the different time units or frequency domain units correspond to different redundancy versions of a same resource block.

20. The communication apparatus according to claim 16, wherein when the DMRS port set indicated by the DMRS port indication information is the first DMRS port set or the second DMRS port set, transmission on a corresponding PDSCH is single-user multiple-input multiple-output (SU-MIMO) transmission.

21. A non-transitory computer-readable storage medium, wherein the non-transitory computer-readable storage medium stores computer-executable instructions that, when executed by a computer, cause the computer to perform operations comprising:
determining demodulation reference signal (DMRS) port indication information, wherein:
the DMRS port indication information is used to indicate a DMRS port set, and the DMRS port set is one of a plurality of DMRS port sets;
a part of the plurality of DMRS port sets are first DMRS port sets, and DMRS ports comprised in each first DMRS port set belong to two code domain multiplexing (CDM) groups; and
another part of the plurality of DMRS port sets are second DMRS port sets, and at least one DMRS port comprised in each second DMRS port set belongs to a same CDM group;
determining quasi-co-location (QCL) indication information, wherein the QCL indication information indicates two pieces of QCL information, the two pieces of QCL information comprising a first piece of QCL information and a second piece of QCL information, wherein:
when the DMRS port set indicated by the DMRS port indication information is a first DMRS port set, the two pieces of QCL information in each precoding resource group (PRG) indicate a reception of a DMRS and data of a corresponding PRG, a DMRS port belonging to a first CDM group is associated with the first piece of QCL information, a DMRS port belonging to a second CDM group is associated with the second piece of QCL information, and
when the DMRS port set indicated by the DMRS port indication information is a second DMRS port set, one of the two pieces of QCL information is associated with reception of a DMRS and corresponding data in each PRG, wherein different pieces of QCL information are used to receive DMRSs and corresponding data in adjacent PRGs; and
sending the DMRS port indication information and the QCL indication information.

22. A non-transitory computer-readable storage medium, wherein the non-transitory computer-readable storage medium stores computer-executable instructions that, when executed by a computer, cause the computer to perform operations comprising:
receiving demodulation reference signal (DMRS) port indication information, wherein:
the DMRS port indication information is used to indicate a DMRS port set, and the DMRS port set is one of a plurality of DMRS port sets;

a part of the plurality of DMRS port sets are first DMRS port sets, and DMRS ports comprised in each first DMRS port set belong to two code domain multiplexing (CDM) groups; and another part of the plurality of DMRS port sets are second DMRS port sets, and at least one DMRS port comprised in each second DMRS port set belongs to a same CDM group;

receiving quasi-co-location (QCL) indication information, wherein the QCL indication information indicates two pieces of QCL information, the two pieces of QCL information comprising a first piece of QCL information and a second piece of QCL information, wherein:

when the DMRS port set indicated by the DMRS port indication information is a first DMRS port set, the two pieces of QCL information in each precoding resource group (PRG) indicate a reception of a DMRS and data of a corresponding PRG, a DMRS port belonging to a first CDM group is associated with the first piece of QCL information, a DMRS port belonging to a second CDM group is associated with the second piece of QCL information, and when the DMRS port set indicated by the DMRS port indication information is a second DMRS port set, one of the two pieces of QCL information is associated with reception of a DMRS and corresponding data in each PRG, wherein different pieces of QCL information are used to receive DMRSs and corresponding data in adjacent PRGs; and receiving the DMRS and corresponding data.

* * * * *

UNITED STATES PATENT AND TRADEMARK OFFICE
CERTIFICATE OF CORRECTION

PATENT NO. : 12,068,992 B2  
APPLICATION NO. : 18/330922  
DATED : August 20, 2024  
INVENTOR(S) : Xianda Liu and Kunpeng Liu Page 1 of 1

It is certified that error appears in the above-identified patent and that said Letters Patent is hereby corrected as shown below:

On the Title Page

In Column 2 Item (57) (Abstract), In Line 1, Delete "(DMRS) A DMRS" and insert -- (DMRS) --.

In Column 2 Item (57) (Abstract), In Line 2-3, Delete "provided, to meet NC JT transmission." and insert -- provided. --.

Signed and Sealed this  
Twenty-sixth Day of November, 2024

Katherine Kelly Vidal  
*Director of the United States Patent and Trademark Office*